(12) United States Patent
Beall et al.

(10) Patent No.: US 11,673,132 B2
(45) Date of Patent: Jun. 13, 2023

(54) HONEYCOMB BODIES HAVING AN ARRAY OF THROUGH CHANNELS WITH A RANGE OF HYDRAULIC DIAMETERS

(71) Applicant: CORNING INCORPORATED, Corning, NY (US)

(72) Inventors: Douglas Munroe Beall, Painted Post, NY (US); Dana Craig Bookbinder, Corning, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/294,109

(22) PCT Filed: Nov. 6, 2019

(86) PCT No.: PCT/US2019/060006
§ 371 (c)(1),
(2) Date: May 14, 2021

(87) PCT Pub. No.: WO2020/101966
PCT Pub. Date: May 22, 2020

(65) Prior Publication Data
US 2022/0008907 A1 Jan. 13, 2022

Related U.S. Application Data

(60) Provisional application No. 62/768,388, filed on Nov. 16, 2018.

(51) Int. Cl.
*B01J 35/04* (2006.01)
*B01D 53/88* (2006.01)
(Continued)

(52) U.S. Cl.
CPC ............ *B01J 35/04* (2013.01); *B01D 46/247* (2013.01); *B01D 46/2482* (2021.08);
(Continued)

(58) Field of Classification Search
None
See application file for complete search history.

(56) References Cited

U.S. PATENT DOCUMENTS 4,298,328 A 11/1981 Frost
4,349,329 A 9/1982 Naito et al.
(Continued)

FOREIGN PATENT DOCUMENTS

CN 101432075 A 5/2009
CN 101535606 A 9/2009
(Continued)

OTHER PUBLICATIONS

Chinese Patent Application No. 201980089158.1, Office Action dated Mar. 24, 2022, 5 pages of English Translation, Chinese Patent Office.
(Continued)

*Primary Examiner* — Elizabeth Collister
(74) *Attorney, Agent, or Firm* — Joseph M. Homa

(57) ABSTRACT

A ceramic honeycomb body, suitable for use in exhaust gas processing, includes a honeycomb structure having a plurality of through-channels, a first portion of the plurality of through-channels have a first hydraulic diameter dh1, a second portion of the plurality of through-channels have a second hydraulic diameter that is smaller than the first hydraulic diameter dh1, the first hydraulic diameter dh1 is equal to or greater than 1.1 mm, and the first and second portions of through-channels, taken together, have a geometric surface area GSA greater than 2.9 mm$^{-1}$. Diesel
(Continued)

oxidation catalysts and methods of soot removal are also provided, as are other aspects.

18 Claims, 9 Drawing Sheets

(51) Int. Cl.
- *C04B 38/00* (2006.01)
- *F01N 3/28* (2006.01)
- *B01D 46/24* (2006.01)
- *B01J 37/00* (2006.01)

(52) U.S. Cl.
CPC ..... *B01D 46/2484* (2021.08); *B01D 46/2486* (2021.08); *B01D 53/885* (2013.01); *B01J 37/0009* (2013.01); *C04B 38/0009* (2013.01); *F01N 3/2828* (2013.01); *B01D 2255/9202* (2013.01); *B01D 2255/9207* (2013.01); *F01N 2330/48* (2013.01)

(56) References Cited

U.S. PATENT DOCUMENTS

| | | |
|---|---|---|
| 7,308,788 B1 | 12/2007 | Das |
| 7,491,373 B2 | 2/2009 | Ketcham et al. |
| 7,566,487 B2 | 7/2009 | Feinstein |
| 7,655,195 B1 | 2/2010 | Ichikawa et al. |
| 8,444,752 B2 | 5/2013 | Beall et al. |
| 8,691,724 B2 | 4/2014 | Simon, III et al. |
| 9,156,742 B2 | 10/2015 | Hayashi et al. |
| 2003/0100448 A1 | 5/2003 | Cutler et al. |
| 2004/0166035 A1 | 8/2004 | Noda et al. |
| 2005/0066639 A1 | 3/2005 | Frost |
| 2006/0008399 A1 | 1/2006 | Feinstein |
| 2014/0298779 A1 | 10/2014 | Miyairi |
| 2015/0037220 A1* | 2/2015 | Goto ................. B01D 46/24491 422/171 |
| 2016/0069308 A1* | 3/2016 | Miyairi ................. B01D 46/249 55/529 |
| 2018/0099240 A1 | 4/2018 | Mori et al. |
| 2018/0280859 A1* | 10/2018 | Yasui ................. B01D 46/2476 |
| 2019/0126186 A1 | 5/2019 | Beall et al. |
| 2019/0374896 A1 | 12/2019 | Beall et al. |

FOREIGN PATENT DOCUMENTS

| | | |
|---|---|---|
| CN | 102625727 A | 8/2012 |
| CN | 107916969 A | 4/2018 |
| EP | 2368621 A1 | 9/2011 |
| JP | 2000-238153 A | 9/2000 |
| JP | 2003-033664 A | 2/2003 |
| JP | 2008-505753 A | 2/2008 |
| JP | 2009-095827 A | 5/2009 |
| JP | 2011-194353 A | 10/2011 |
| JP | 2013-173133 A | 9/2013 |
| WO | 01/15877 A1 | 3/2001 |
| WO | 2017/185091 A2 | 10/2017 |
| WO | 2020/101965 A1 | 5/2020 |

OTHER PUBLICATIONS

Japanese Patent Application No. 2021-526795, Notice of Allowance, dated May 11, 2022, 06 pages (02 pages of English Translation and 04 pages of Original); Japanese Patent Office.

International Search Report and Written Opinion of the International Searching Authority; PCT/US2019/060006 ; dated May 4, 2020; 15 pages; European Patent Office.

\* cited by examiner

US 11,673,132 B2

HONEYCOMB BODIES HAVING AN ARRAY OF THROUGH CHANNELS WITH A RANGE OF HYDRAULIC DIAMETERS

This is a national stage application under 35 U.S.C. § 371 of International Application No. PCT/US2019/060006, filed on Nov. 6, 2019, which claims the benefit of priority under 35 U.S.C. § 119 of U.S. Provisional Application No. 62/768, 388 filed on Nov. 16, 2018, the content of which is incorporated herein by reference in its entirety.

FIELD

The present disclosure relates to honeycomb bodies, and more particularly to honeycomb bodies having an array of through channels and methods of making such bodies.

BACKGROUND

Honeycomb bodies have been used in catalytic converters and particulate filters for applications such as in automotive exhaust after treatment systems. For example, the honeycomb body may comprise a porous ceramic material and may be used a substrate in catalytic converters or particulate filters.

Ceramic honeycomb bodies can be manufactured by preparing a honeycomb green body by mixing ceramic-forming materials with a liquid vehicle (e.g., water), optional pore forming materials and processing aids to form a plasticized batch. The plasticized batch can be formed into a honeycomb green body by extrusion through an extrusion die. The green honeycomb body can be dried and fired in a furnace or the like to produce a porous ceramic honeycomb body.

The ceramic honeycomb body may subsequently be coated with a catalyst-containing washcoat in the case of a flow-through substrate application. In the case of a particulate filter, the ceramic honeycomb body may be plugged and may optionally be coated with a catalyst-containing washcoat. In each case, the honeycomb body after catalyzation and/or plugging can be combined with a housing (e.g., a can), to provide an assembly that is suitable for use in an automotive exhaust after treatment systems, for example.

SUMMARY

In some embodiments of this disclosure, a honeycomb body is provided that has improved catalytic efficiency per unit volume and that is resistant to face-plugging caused by particulates present in an exhaust stream. Such a honeycomb body may be viewed as being made up of a repeating pattern of structural units, where those structural units comprise a plurality of channels disposed in a parallel relationship to each other in an axial direction, wherein a first portion of the plurality of channels have a hydraulic diameter equal to or greater than 1.1 mm, a second portion of the plurality of channels have a hydraulic diameter less than 1.1 mm, and the plurality of channels have a geometric surface area greater than 2.9 $mm^{-1}$. These honeycomb bodies can comprise a ceramic material, and the plurality of channels may be flow-through channels that extend between an inlet face and an outlet face of the honeycomb body. A catalyst-containing coating may be disposed in the channels of the honeycomb body, as an on-the-wall or an in-the wall coating. In some embodiments the honeycomb body has a channel density ("CD") greater than 62.0 channels/$cm^2$ (400 channels per square inch (cpsi)), the first portion of the plurality of channels has a channel density between 6.2 channels/$cm^2$ (40 cpsi) and 46.5 channels/$cm^2$ (300 cpsi), and an area ratio of a total cross-sectional area of the first portion of the plurality of channels to a total cross-sectional area of the second portion of the plurality of channels, expressed as a percentage, ranges from 3% to 40%.

In some embodiments of this disclosure, a diesel oxidation catalyst (DOC) is provided. The DOC comprises a honeycomb body having a first portion of channels and a second portion of channels, wherein the first portion of channels have a hydraulic diameter greater than or equal to 1.1 mm, the second set of channels have a hydraulic diameter less than 1.1 mm, and the honeycomb body comprises a geometric surface area that is greater than or equal to 2.9 $mm^{-1}$.

In some embodiments of this disclosure, a honeycomb body is provided. The honeycomb body comprises a honeycomb structure comprising a plurality of channels disposed in parallel to each other in an axial direction, wherein a first portion of the plurality of channels have a $dh \geq 1.1$ mm, a second portion of the plurality of channels have a $dh \leq 1.1$ mm, and the plurality of channels in the honeycomb structure comprise $GSA \geq 2.9$ $mm^{-1}$, wherein dh is hydraulic diameter and GSA is the geometric surface area.

In another embodiment of this disclosure, a method of reducing face-plugging in a honeycomb body having flow-through channels is provided. The method includes providing a flow-through honeycomb body having large channels and small channels, the large channels having a hydraulic diameter of greater than or equal to 1.1 mm, the small channels having a hydraulic diameter less than 1.1 mm, and the large channels and the small channels, taken together, have a geometric surface area greater than or equal to 2.9 $mm^{-1}$. The method of reducing face-plugging further comprises flowing soot-laden exhaust gas through the large channels and the small channels, wherein the large channels act as bypass channels thereby reducing face-plugging of the flow-through honeycomb body. In various embodiments, the soot-laden exhaust gas may be diesel exhaust or exhaust from a gasoline engine.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

DETAILED DESCRIPTION

Figure 1A:
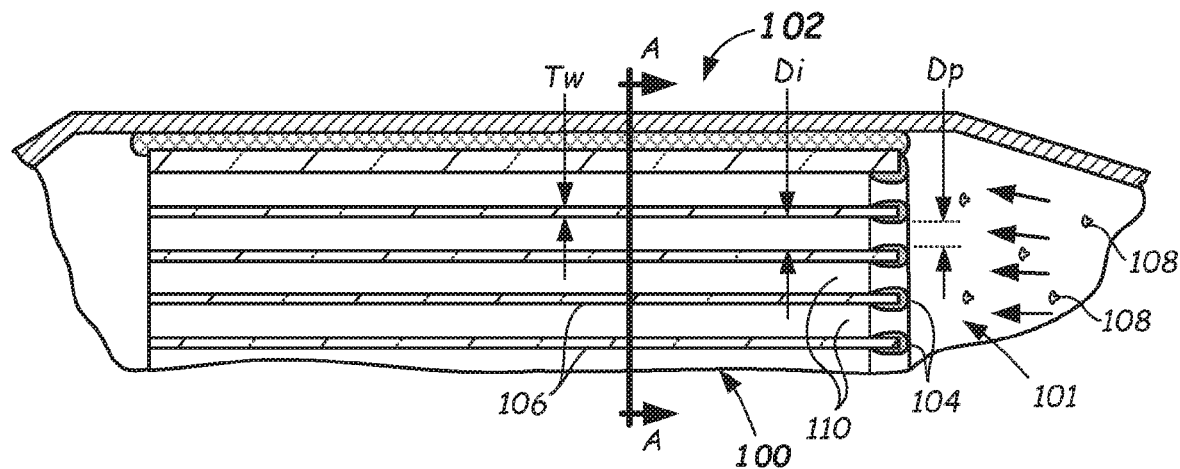
FIG. 1A schematically illustrates a partial cross-sectional view of a face-plugged inlet face of a conventional honeycomb body according to the prior art.

Reference will now be made in detail to the example embodiments of this disclosure, which are illustrated in the accompanying drawings. In describing the embodiments, numerous specific details are set forth in order to provide a thorough understanding of the disclosure. However, it will be apparent to one skilled in the art that embodiments of the disclosure may be practiced without some or all of these specific details. In other instances, well-known features and/or process steps have not been described in detail so as not to obscure embodiments of the disclosure. Features of the various embodiments described herein may be combined with each other, unless specifically noted otherwise.

The materials, components, and assemblies described herein as making up the various embodiments are intended to be illustrative and not restrictive. Many suitable materials and components that would perform the same or a similar function as the materials and components described herein are intended to be embraced within the scope of embodiments of the present disclosure.

A diesel oxidation catalyst (DOC) may be used to promote oxidation of carbon monoxide (CO), and hydrocarbons (HC), as well as the soluble organic fraction (SOF) of diesel exhaust. As used herein, DOC refers to a ceramic honeycomb substrate with a catalytic coating disposed in the channels, such as in or on at least a portion of its interior channel walls.

In various automotive exhaust applications, a DOC may be used in conjunction with a diesel particulate filter (DPF). In some of these arrangements, the DPF is located downstream of the DOC. The DOC plays a role in the controlled regeneration of particulate matter in the DPF downstream of the DOC. The DPF collects soot particles over time, and eventually needs to be regenerated. Regeneration of the DPF is accomplished either in a passive mode, where the exhaust temperatures become high enough to promote oxidation of the soot, or in an active mode where fuel is injected into the exhaust to be oxidized in the DOC and raise the inlet temperature of the gas entering the DPF so that regeneration may occur.

In many cases, space for the DOC and DPF is quite limited on the vehicle where the DOC and DPF are to be installed. Therefore, DOC and DPF designs that reduce the space envelope required for these devices are valued by customers. With respect to the DOC, one approach to reducing its volume is to increase channel density, for example, using cellular configurations that comprise channel density CD of 93.0 channels/cm$^2$ (600 channels per square inch (cpsi)) as opposed to a lower CD of 62.0 channels/cm$^2$ (400 cpsi). Such an increase in CD results in a corresponding increase in geometric surface area (GSA), which improves catalytic efficiency per unit volume of the DOC. In turn, this allows the same amount of catalytic activity in a reduced volume DOC. Not only does a reduced volume DOC fit more easily into a vehicle exhaust system, it also can cost less to manufacture.

Notwithstanding the advantages in catalytic activity and space savings that a higher CD designs (e.g., 93.0 channels/cm$^2$ (600 cpsi)) provide, a disadvantage of this approach is a phenomenon known as "face-plugging." Referring to FIG. 1A, face-plugging refers to the blockage of the inlet face 101 of a honeycomb body 100, such as the inlet face 101 of a DOC 100 by a build-up of soot layer 104 on the inlet ends of the walls 106 from soot particles 108 entrained in the exhaust stream (exhaust flow depicted by arrows). As the soot layer 104 from the exhaust stream builds on the ends of the walls 106 at the inlet face 101, the soot layer 104 can partially, or even nearly fully, bridge across the channels 110. The build-up of the soot layer 104 impedes or blocks the flow of exhaust gas through the channels 110 of the DOC 102 by effectively reducing the effective diameter from the initial diameter Di to a face-plugged diameter Dp. Face-plugging has not been found to be a significant problem in conventional honeycomb bodies of DOCs having a CD of 62.0 channels/cm$^2$ (400 cpsi). However, the smaller channel size, such as is found in a honeycomb body 100 having a CD of 93.0 channels/cm$^2$ (600 cpsi) has been found to suffer from face-plugging. Thus, honeycomb bodies comprising higher CDs have a channel size that is small enough to be at least partially bridged by the soot layer 104 generated by soot particles 108 in the exhaust (e.g., the diesel exhaust).

The most problematic type of soot particle 108 is the SOF, which includes low molecular weight "wet" or "sticky" soot particles. These SOF particles may reach high concentrations during low temperature operation of a diesel engine such as during idling, or during stop-and-go driving in diesel-powered vehicles such as, for example, dump trucks and delivery trucks. Face-plugging may also occur on the inlet face 101 of the DOC 100 during cold ambient operating temperatures, and during relatively low exhaust temperature ranges such as 220° C.-400° C., such as during startup.

Plugging of the inlet face 101 of the DOC 100 can result in very high backpressure against the engine. High backpressure can cause poor fuel economy. In extreme cases, face-plugging can lead to poor engine performance. Conventionally, when the back pressure increases due to face-plugging, an engine control module associated with the diesel-powered vehicle will interpret this increased back-pressure as a DPF that is full of soot. Detection of this full DPF condition can cause the engine control module to initiate a regeneration, which can include injecting HC into the exhaust where its combustion will increase the temperature of the exhaust stream. However, the injection of HC into the exhaust stream can also increases the amount of SOF particles, which are the type of soot particles that are most effective at forming soot layers 104 that can partially bridge across the channels 110 at the inlet face 101 of the honeycomb body 100 of the DOC 102. This can result in even more prevalent face-plugging.

Further, when the engine control module detects that the inlet temperature of the DPF is not at the required temperature for regeneration, more HC is injected, and the exacerbating the face-plugging problem. The few channels 110 in the honeycomb body 100 of the DOC 102 that may remain open will be delivering a large amount of HC slip to the DPF. This occurs because the high concentration of HC is going through a relatively small number of channels and therefore the catalytic efficiency can be very low. The result is a high concentration of HC reaching the DPF, which, in combination with the oxidation catalyst and the accumulated soot, can lead to an over-temperature condition. Therefore, a honeycomb body, such as for the DOC application, that provides high catalytic efficiency per unit volume with reduced face-plugging is needed.

Several approaches to avoiding face-plugging have been suggested with proposed solutions addressing catalyst loading, substrate design and engine operation schemes, but each has corresponding disadvantages. One of these approaches involves "painting" a high concentration of catalyst on the inlet face of the honeycomb body 100 of the DOC 102 to make oxidation more efficient at that inlet location, but this is very costly. Another approach involves contouring the inlet face 101 of the DOC 100, or cutting ridges in the inlet face 101 to create an increase in the inlet face area of the individual channels. But this approach requires a larger volume for the DOC, the contoured inlet face is susceptible to damage during handling, and it involves extra manufacturing process that can increase cost. Yet another approach involves managing engine operation to keep the operation out of the portion of the engine map where high levels of SOF particles are produced. However, this requires that the engine be operated under conditions that do not favor good fuel economy, and can produce relatively higher NOx levels, which the catalyst system may not be able to attenuate effectively.

Therefore, a honeycomb body, such as for a DOC, with high GSA and a low susceptibility to large scale face-plugging of the inlet face is desired. Various embodiments in accordance with this disclosure comprise a honeycomb body, such as a ceramic honeycomb body, having a variety of different channel sizes. More particularly, these embodiments include a honeycomb body with some of the channels having a small size (small cross-sectional area)/high CD to achieve the high GSA needed for reduced volume, and other channels having a large enough size (cross-sectional area) to provide for a bypass of exhaust during times when the vehicle is being operated under conditions where the small size channels would otherwise be susceptible to face-plugging.

Various embodiments in accordance with this disclosure provide a combination of small channels to large channels such that the GSA of these embodiments is not substantially reduced as compared to a honeycomb body without such bypass channels. The bypass channels in accordance with this disclosure not only provide relief in pressure drop by helping to keep a portion of the DOC open to gas flow via minimized face plugging, but also provide for clean-up of the soot on the inlet face through the active regeneration techniques that are ineffective in the conventional high CD designs where the inlet face has become plugged.

While a conventional honeycomb body may consist of an array of through channels having a single shape and single size (transverse cross-sectional area) that are repeated across the honeycomb body, various embodiments in accordance with the this disclosure provide a flow-through honeycomb body containing a plurality of through channels, some of which have a hydraulic diameter dh larger than others of the plurality of through channels. In various embodiments, at least some of the channels have a hydraulic diameter dh greater than or equal to a critical hydraulic diameter dhc of 1.1 mm, other channels have a hydraulic diameter that is smaller than 1.1 mm, and the collective geometric surface area of the array of larger and smaller through channels is greater than or equal to 2.9 $mm^{-1}$.

Various honeycomb bodies in accordance with this disclosure may be prepared in any suitable manner. In some embodiments, a porous ceramic honeycomb body may be configured for use in a catalytic converter, that is, it may be a substrate for deposit of a washcoat including one or more catalyst metals such as platinum, palladium, rhodium, and the like, and combinations thereof. These one or more metals function to catalyze at least one reaction between various components of an exhaust stream, such as of an exhaust stream from an internal combustion engine exhaust (e.g., gasoline engine or diesel engine). Other metals may be added such as nickel and manganese to block sulfur absorption by the washcoat. A catalyzed reaction may include the oxidation of carbon monoxide to carbon dioxide, for example. Modern three-way catalytic converters may also reduce oxides of nitrogen (NOx) to nitrogen and oxygen. Additionally, the catalytic converter including a honeycomb body in accordance with this disclosure may facilitate the oxidation of unburnt hydrocarbons to carbon dioxide and water.

In accordance with embodiments, a ceramic honeycomb substrate may be made of an intersecting matrix of walls of a suitable porous material (e.g., porous ceramic). The catalytic material(s) may be suspended in a washcoat of inorganic particulates and a liquid vehicle, and disposed in the channels of the porous ceramic honeycomb body, such as by application of an in-the-wall or on-the-wall (or both) washcoat. Thereafter, the coated ceramic honeycomb body may be wrapped with a cushioning material and received in a can (or housing) via a canning process.

A green honeycomb body may be formed from a ceramic-forming batch composition mixture. The ceramic-forming batch composition mixture can comprise, for example, ceramic particulates or ceramic precursor particulate materials, or both, organic particulates, such as methylcellulose, and optional pore formers, processing aids (oil and/or other rheology modifiers), a liquid vehicle (e.g., de-ionized water), and the like, and combinations thereof. The honeycomb body can be formed by any suitable forming method. When dried and fired, the green honeycomb body is sintered into a porous ceramic honeycomb body, for example, suitable for exhaust after-treatment purposes. The ceramic honeycomb body can comprise any suitable ceramic material composition, such as cordierite, aluminum titanate, alumina, mullite, silicon carbide, silicon nitride, or the like, and combinations thereof.

In accordance with one method, the honeycomb body can be formed by an extrusion process where a ceramic-forming batch composition is plasticized and extruded to form the green honeycomb body. The green honeycomb body can then be dried by any suitable drying method, and fired to form the porous ceramic honeycomb body. The extrusion can be performed using a hydraulic ram extrusion press, a two-stage de-airing single auger extruder, or a twin-screw extruder, with an extrusion die in a die assembly attached to the discharge end thereof.

Honeycomb extrusion dies employed to produce such green honeycomb bodies can be multi-component assemblies including, for example, a wall-forming die body combined with a skin-forming mask. For example, U.S. Pat. Nos. 4,349,329 and 4,298,328 disclose die structures including skin-forming masks. The die body may incorporate batch feedholes leading to, and intersecting with, an array of discharge slots formed in the die face, through which the plasticized batch composition is extruded. The extrusion process forms an interconnecting array of crisscrossing walls forming a central cellular honeycomb structure. A mask can be employed to form an outer peripheral skin, and the mask may be a ring-like circumferential structure, such as in the form of a collar, defining the periphery of the skin of the honeycomb structure. The circumferential skin layer of the honeycomb structure can be formed by extruding the batch material between the mask and the die body.

The extruded material, referred to as extrudate, may be cut to create the green honeycomb bodies. The extrudate can alternatively be in the form of a honeycomb segment, which may be connected or bonded together after firing to form a segmented honeycomb body of the desired size. These honeycomb segments and resulting segmented honeycomb structures can be any desired overall size and shape.

Various embodiments in accordance with this disclosure provide honeycomb bodies, such as porous ceramic honeycomb bodies, having a plurality of flow-through channels. Flow-through channels are unplugged, i.e., they are devoid of channel plugs like those included in particulate filters. In other words, flow is in the inlet end and out the outlet end of the channels. Some of the flow-through channels have a hydraulic diameter dh large enough (larger channels) to reduce face-plugging by exhaust particulates (referred to as bypass channels), and others of those flow-through channels have a smaller hydraulic diameter dh (smaller channels), such that taken together, the plurality of channels has a GSA greater than or equal to 2.9 mm$^{-1}$. The larger channels have a greater cross-sectional area than do the smaller channels.

Various embodiments provide honeycomb bodies, such as porous ceramic honeycomb bodies, with an overall "combined CD" greater than 62 channels/cm$^2$ (400 cpsi) and channels corresponding to the large hydraulic diameter have a channel density between 6.2 channels/cm$^2$ (40 cpsi) and 46.5 channels/cm$^2$ (300 cpsi). Various embodiments provide a channel ratio (CR) of a total cross-sectional area of bypass channels (Ab) to a total cross-sectional area of all the plurality of channels (Atot=area of bypass plus area of smaller channels), expressed as a percentage, ranging from 3% to 40% as shown in Equations 1 and 2 below.

$$CR=Ab/Atot\times 100 \qquad\qquad\qquad \text{Eqn. 1}$$

$$3\%\leq CR\leq 40\% \qquad\qquad\qquad \text{Eqn. 2}$$

In other embodiments, the honeycomb body can comprise a combined CD≥77.5 channels/cm$^2$ (500 cpsi), bypass channels can comprise a 6.2 channels/cm$^2$ (40 cpsi)≤CD≤31.0 channels/cm$^2$ (200 cpsi), and the channel ratio CR can be 3%≤CR≤40%. In still other embodiments, the honeycomb body can comprise a combined CD≥93.0 channels/cm$^2$ (600 cpsi), bypass channels can comprise 6.2 channels/cm$^2$ (40 cpsi)≤CD≤31.0 channels/cm$^2$ (200 cpsi), and 3%≤CR≤40. In still other embodiments, the honeycomb body comprises a combined CD≤93.0 channels/cm$^2$ 139.5 (900 cpsi), bypass channels can comprise a 6.2 channels/cm$^2$ (40 cpsi) ≤CD≤31.0 channels/cm$^2$ (200 cpsi), and 3%≤CR≤40%.

In various embodiments, honeycomb bodies (e.g., ceramic honeycomb bodies) in accordance with this disclosure comprise flow-through channels that extend, in parallel with each other, from an inlet face of the honeycomb body to an outlet face of the honeycomb body. In some embodiments, all of the channels comprise flow-through channels that are devoid of plugs therein.

Figure 1B:
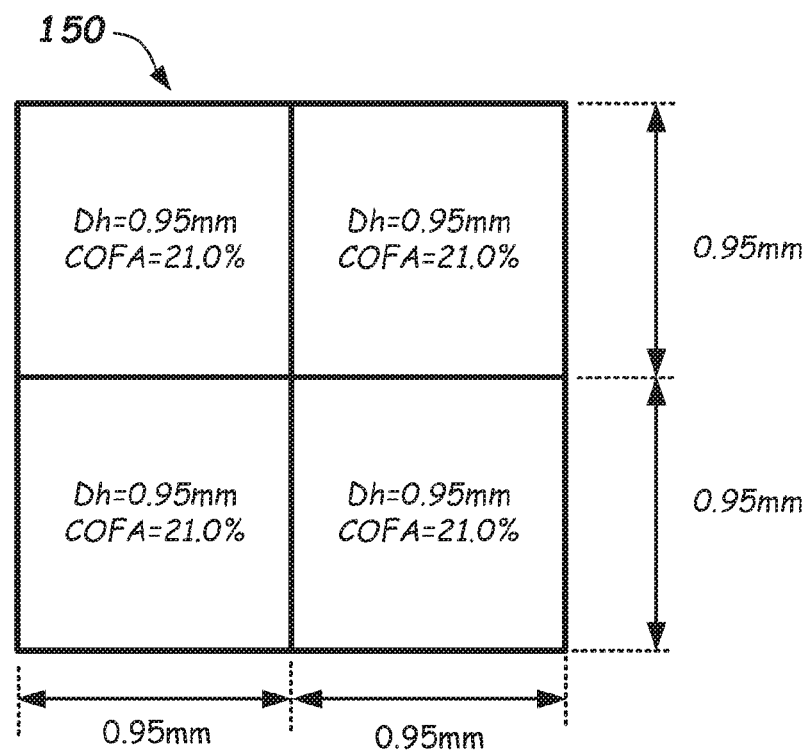
FIG. 1B schematically illustrates an end view of a four-channel unit cell of a conventional honeycomb body having 600 cells per square inch and 3.5 mil thick walls (a 600/3.5 configuration), wherein each channel has a same hydraulic diameter according to the prior art.

FIG. 1B illustrates a four-channel, unit cell structure 150 of a conventional honeycomb body 100 of the prior art having a 600/3.5 configuration of CD/Tw, wherein CD is cell density (in cpsi) and Tw is the transverse thickness of the walls 106, as measured on the transverse cross section A-A shown. In other words, the honeycomb body 100 comprises CD of 93 channels/cm$^2$ (600 cpsi), and a transverse wall thickness Tw of 0.089 mm (3.5 mils). Each channel 110 of the unit cell structure 150 and of the honeycomb body 100 therefore has a hydraulic diameter dh of 0.95 mm. Hydraulic diameter dh is calculated herein, for all geometries, is as shown in Equation 3:

$$dh=4A/P \qquad\qquad\qquad \text{Eq. 3}$$

wherein "A" is a transverse cross-sectional area of the channel 110 and "P" is the perimeter length of the channel 110 as measured at the transverse cross section A-A.

The overall open frontal area (OFA) of the honeycomb body 100 having a 600/3.5 configuration is 84% and the geometric surface area (GSA) is 3.5 mm$^{-1}$. GSA is the surface area of the channels per unit volume of a body (including walls and channels). As shown, the contribution OFA % of the total OFA % of the unit channel structure 150 is shown, where each channel has an equal contribution to open frontal area (COFA %), wherein the COFA % is the relative percentage of the OFA % of each channel that then sums to the total OFA % of the unit channel structure.

Figure 2:
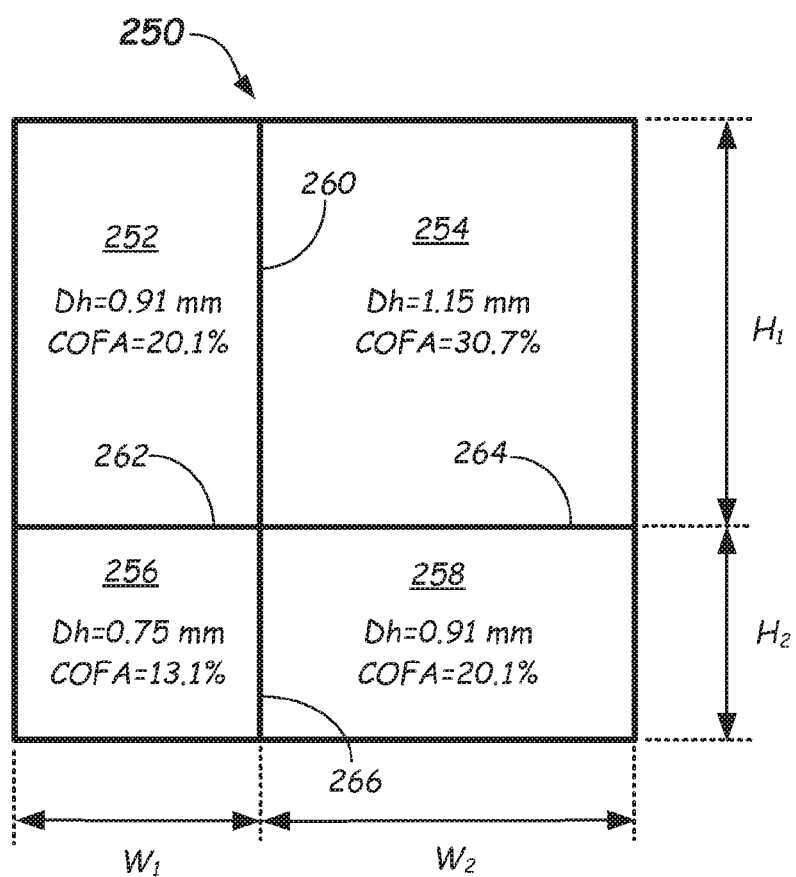
FIG. 2 schematically illustrates an end view of a four-channel unit cell of a honeycomb body having 600 cells per square inch and 3.5 mil thick walls (600/3.5) and non-uniform hydraulic diameters in accordance with this disclosure.

FIG. 2 schematically illustrates a first inventive example of a unit channel structure 250 comprising four-channels of a honeycomb body 300 (FIG. 3) in accordance with this disclosure. If the spacing of the walls of the conventional design (shown in FIG. 1B) is modified from a constant hydraulic diameter dh design with dh of 0.95 mm to a staggered design having alternating wall heights H and lengths L of greater than and less than the conventional wall spacing, such W2 and H1 of 1.15 mm and W1 and H2 of 0.75 mm, for example, then a channel configuration of the unit channel structure 250 having three different channel sizes can be produced. In particular, the total OFA % and GSA of the conventional design (FIGS. 1A-1B) are retained, while some of the channels (e.g., 25% of the channels, as shown) have a hydraulic diameter dh that is large enough to act as a bypass channel for particulates in an exhaust stream, such as, for example, a diesel or other soot-laden exhaust stream.

In some embodiments, the hydraulic diameter dh of the channel pf the unit channel structure 250 that is large enough to act as a bypass channel may be greater than or equal to 1.1 mm (i.e., dh≥1.1 mm). In other embodiments, the hydraulic diameter dh large enough to act as a bypass channel may be greater than or equal to 1.15 mm (i.e., dh≥1.15 mm). The remaining channels have a smaller hydraulic diameter dh than the conventional design of FIG. 1B, and may have a greater susceptibility to face-plugging. However, more than a third (30.7/84=0.37) of the total open frontal area of the unit channel structure 250 would remain unblocked even under conditions favoring face-plugging because of the presence of the bypass channel.

A first example of a four-channel, unit channel structure 250 is shown in FIG. 2. The unit channel structure 250 comprises a first channel 252 having a height H1, and a width W1; a second channel 254 having a height H1, and a width W2; a third channel 256 having a height H2, and a width W1; and a fourth channel 258 having a height H2, and a width W2. First channel 252 and second channel 254 share a common wall 260; first channel 252 and third cell 256 share a common wall 262; second cell 254 and fourth channel 258 share a common wall 264; and third channel 256 and fourth channel 258 share a common wall 266. In particular, in this embodiment of unit channel structure 250, H1>H2 and W2>W1. Further, in some embodiments, H2 can equal W1 so that third channel 256 comprises a square in transverse cross-section. Further, in some embodiments H1 can equal W2 so that the second channel 254 comprises a square in transverse cross-section. Other proportions of W1 and H2 and W2 to H1 can be used.

By way of example and not limitation, unit channel structure 250 can be provided with a height H1 being 1.15 mm, a height H2 being 0.75 mm, a width W1 being 0.75 mm, and a width W2 being 1.15 mm. It will be appreciated that other widths and heights may be used in various embodiments in accordance with this disclosure. Given the heights and widths of example unit channel structure 250, the hydraulic diameter dh1 of first channel 252 is 0.91 mm, the hydraulic diameter dh2 of second channel 254 is 1.15 mm, the hydraulic diameter dh3 of the third channel 256 is 0.75 mm, and the hydraulic diameter dh4 of the fourth channel 258 is 0.91 mm.

Still referring to FIG. 2, the hydraulic diameter dh1 of first channel 252 is given by dh1=4(W1×H1)/2(W1+H1); the hydraulic diameter dh2 of second channel 254 is given by dh2 4(W2×H1)/2(W2+H1); the hydraulic diameter dh3 of the third channel 256 is given by dh3=4(W1×H2)/2(W1+H2); and the hydraulic diameter dh4 of fourth channel 258 is given by dh4=4(W2×H2)/2(W2+H2).

The dimensions of second channel 254 of the unit channel structure 250 can be chosen for this embodiment such that at least one of the four channels 252, 254, 256, and 258 comprises a hydraulic diameter dh that is greater than or equal to a "critical hydraulic diameter" dhc. As used herein, the expression "critical hydraulic diameter" refers to a minimum hydraulic diameter which reduces or avoids face-plugging. In this example embodiment, the critical hydraulic diameter dhc has been experimentally determined by the inventors to be greater than 1.1 mm. However, in some embodiments, the critical hydraulic diameter dhc may be equal to or greater than 1.15 mm.

Figure 3:
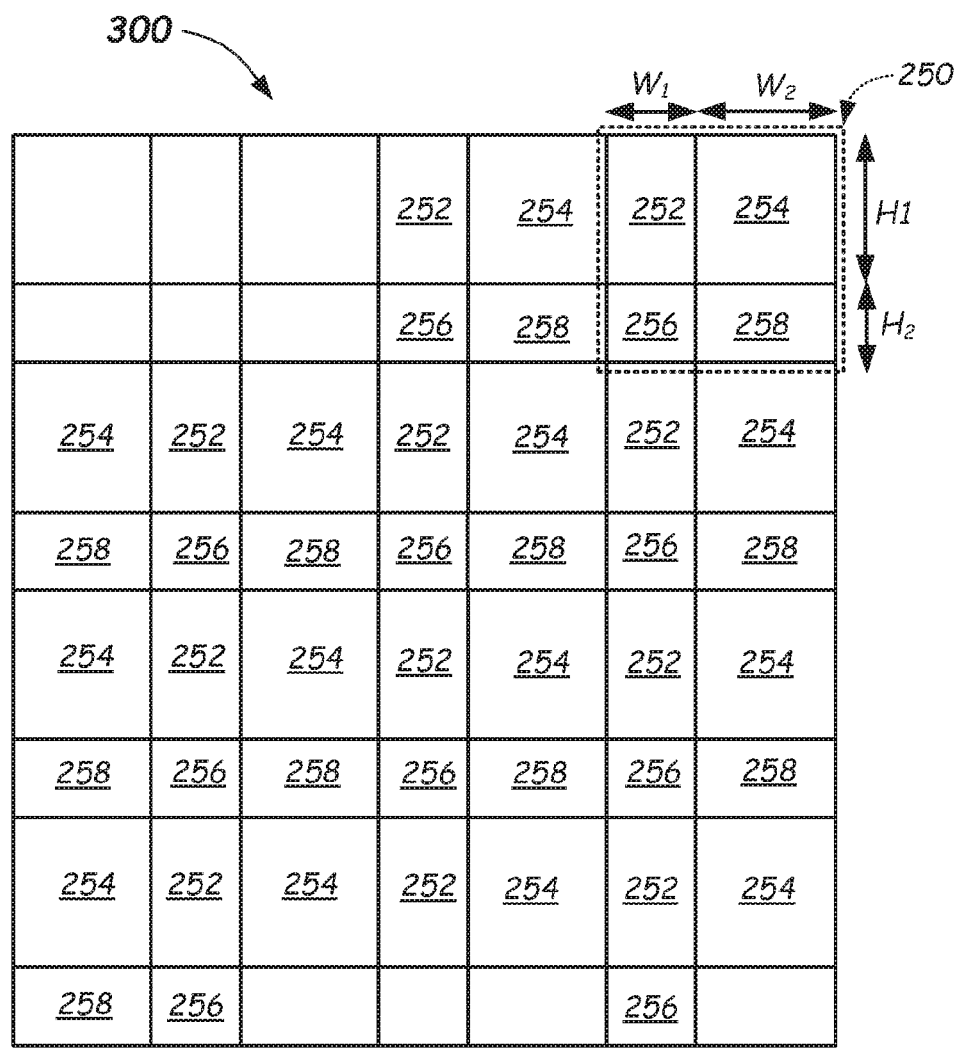
FIG. 3 schematically illustrates a partial end view of an example honeycomb body formed from the four-channel unit cell of FIG. 2 in accordance with this disclosure.

FIG. 3 illustrates an example of a portion of a honeycomb body 300, such as a ceramic honeycomb body, formed from the unit channel structure 250 of FIG. 2B in accordance with this disclosure (a unit channel structure 250 surrounded by a dotted line in FIG. 3). More particularly, FIG. 3 illustrates a cross-sectional end view of a portion of a honeycomb body 300 made up of an array of four-channel unit channel structures 250 that are disbursed across the body. The unit channel structures 250 can be disbursed uniformly across the entire matrix of the honeycomb body 300. Although not shown, the unit channel structures 250 can extend all the way to the skin of the honeycomb body 400 at an outer periphery of the body. Because honeycomb body 300 is made up of a plurality of the unit channel structures 250, it possesses the same characteristics as the individual unit channel structure 250. For example, the channels having a hydraulic diameter dh (e.g., dh1) greater than or equal to the critical hydraulic diameter dhc (e.g., dh1≥1.1 mm) are resistant to face-plugging, and in some embodiments face-plugging does not occur in those channels.

Figure 4:
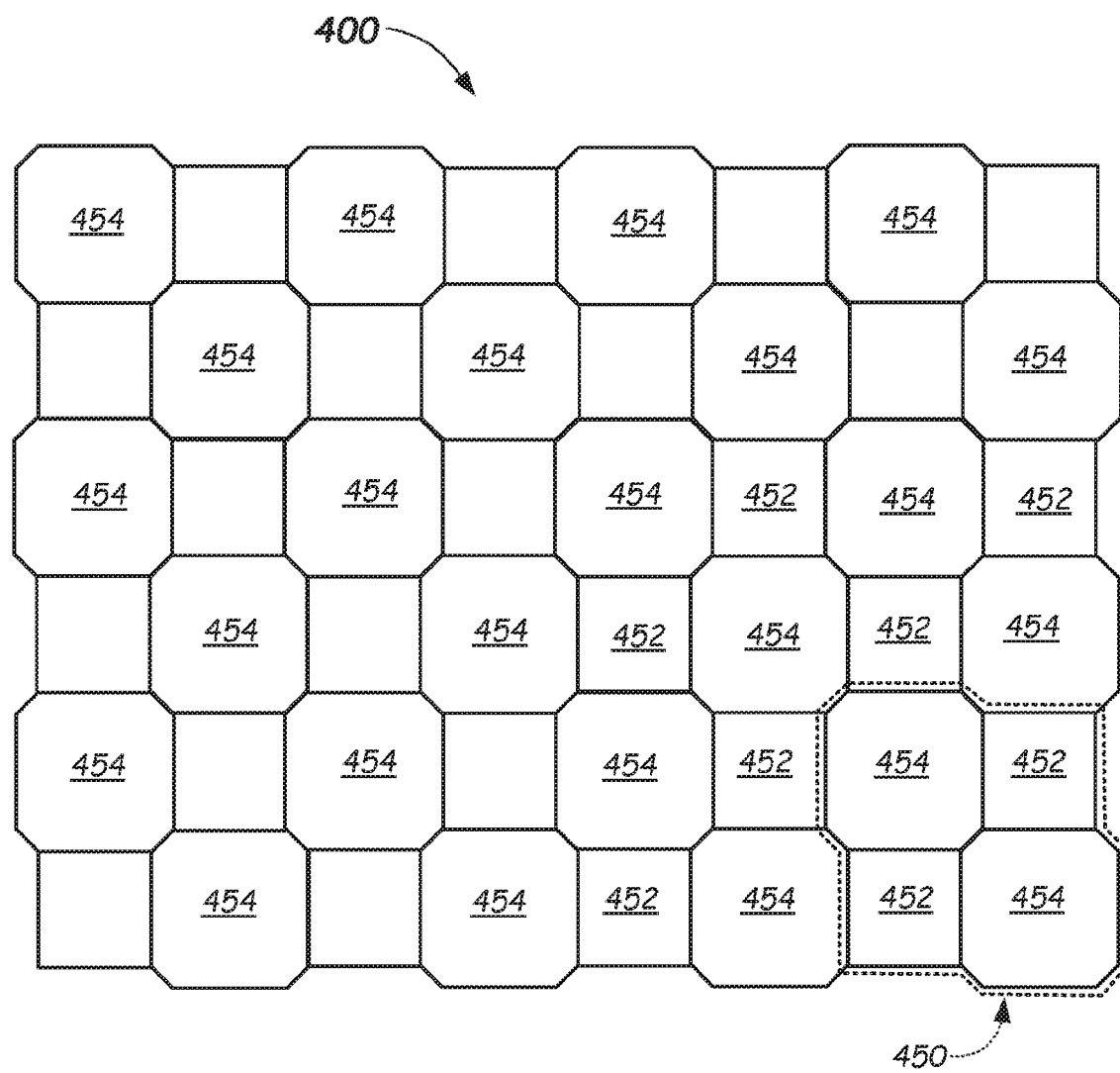
FIG. 4 schematically illustrates a partial end view of an example honeycomb body comprising an asymmetric cell (AC) structure with the large channels configured to provide bypass channels in accordance with this disclosure.

FIG. 4 illustrates another example honeycomb body 400, which can be a ceramic honeycomb body, having an asymmetric cell (AC) structure, formed from a plurality of unit channel structures 450, wherein the large channels of each unit channel structure 450 are configured to provide bypass channels therein, in accordance with this disclosure. More particularly, the unit channel structures 450 and the honeycomb body 400 comprises a plurality of first channels 455 having a first hydraulic diameter dh1, and a plurality of second channels 452 (a few labeled) having a second hydraulic diameter dh2. First channels 454, as depicted, are the large channels and comprise eight-sided channels (octagons), and second channels 452, as depicted, are four-sided channels (e.g., squares or rectangles).

Referring again to FIG. 4, it can be seen that first channels 454 and second channels 452, and the unit channel structures 450, are shown arranged in an interleaved repeating pattern across the body. Although not shown, the unit channel structures 450 can extend all the way to the skin of the honeycomb body 400. In this embodiment, the first hydraulic diameter dh1 of the unit channel structure 450 is larger than the second hydraulic diameter dh2 (dh1>dh2). Furthermore, in this embodiment, the first hydraulic diameter dh1 of the unit channel structure 450 is large enough that the first channels 455 may reduce the face-plugging by soot particulates in a diesel exhaust stream, and therefore first channels 455 within the unit channel structures 450 and the honeycomb body 400 may function as bypass channels. In this embodiment, the first hydraulic diameter dh1 is greater than or equal to the critical hydraulic diameter dhc, which is 1.1 mm (dh1≥1.1 mm), the second hydraulic diameter dh2 is less than 1.1 mm (dh2<1.1 mm), and the GSA of first channels 402 and second channels 404, taken together, of the unit channel structure 450 is greater than or equal to 2.9 $mm^{-1}$. In some embodiments the first hydraulic diameter dh1 may be equal to or greater than 1.15 mm to further minimize face plugging.

Figure 5:
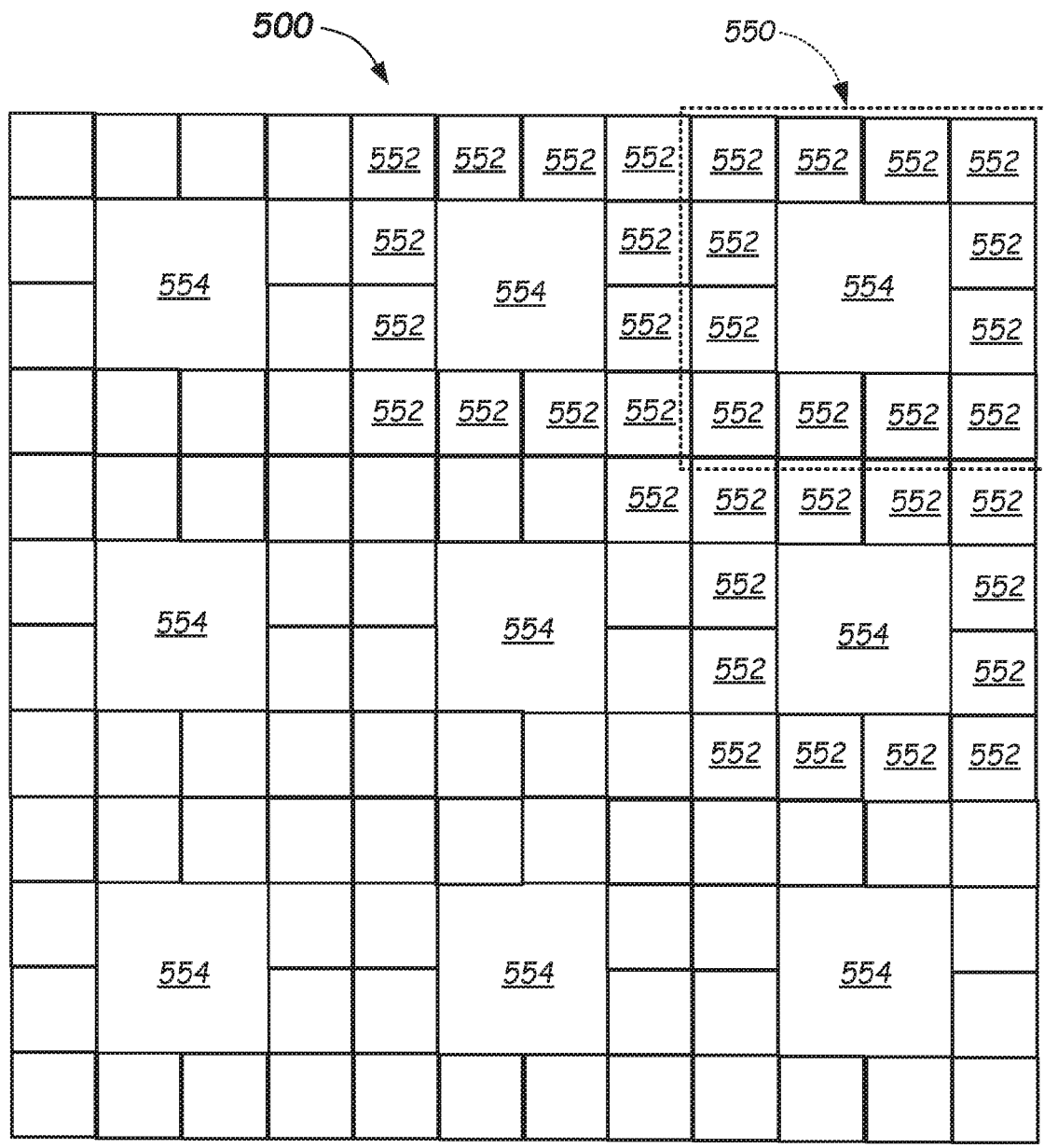
FIG. 5 schematically illustrates a partial end view of an example honeycomb body having bypass channels that are four times larger in cross-sectional area than the non-bypass channels, wherein the larger bypass channels represent about one third of the total open frontal area (OFA) in accordance with this disclosure.

FIG. 5 illustrates another portion of an example honeycomb body 500 having bypass channels that are four times larger than the non-bypass channels, and that represent about one third (about 33%) of the total open frontal area (OFA) of the honeycomb body 500 in accordance with this disclosure. More particularly, honeycomb body 500 comprises a plurality of unit channel structures 550 each having first channels 554 (a few labeled) having a first hydraulic diameter dh1, and second channels 552 (a few labeled) have a second hydraulic diameter dh2 that is smaller than the first hydraulic diameter dh1 (dh2<dh1). First channels 554 are four-sided (e.g., large squares), and second channels 552 are four-sided (small squares). In this embodiment, first channels 554 (large channels) share a common wall with each of eight different second channels 552 (small channels). First channels 554 act as and comprise bypass channels because the first hydraulic diameter dh1 is greater than the critical hydraulic diameter dhc. In this embodiment, the first hydraulic diameter dh1 of the unit channel structure 550 is greater than or equal to 1.1 mm (dh1≥1.1 mm), the second hydraulic diameter dh2 is less than the critical hydraulic diameter (dh2<1.1 mm), and the GSA of first channels 554 and second channels 552, taken together, is greater than or equal to 2.9 $mm^{-1}$. In some embodiments the first hydraulic diameter dh1 may be equal to or greater than 1.15 mm (dh1≥1.15 mm).

Figure 6:
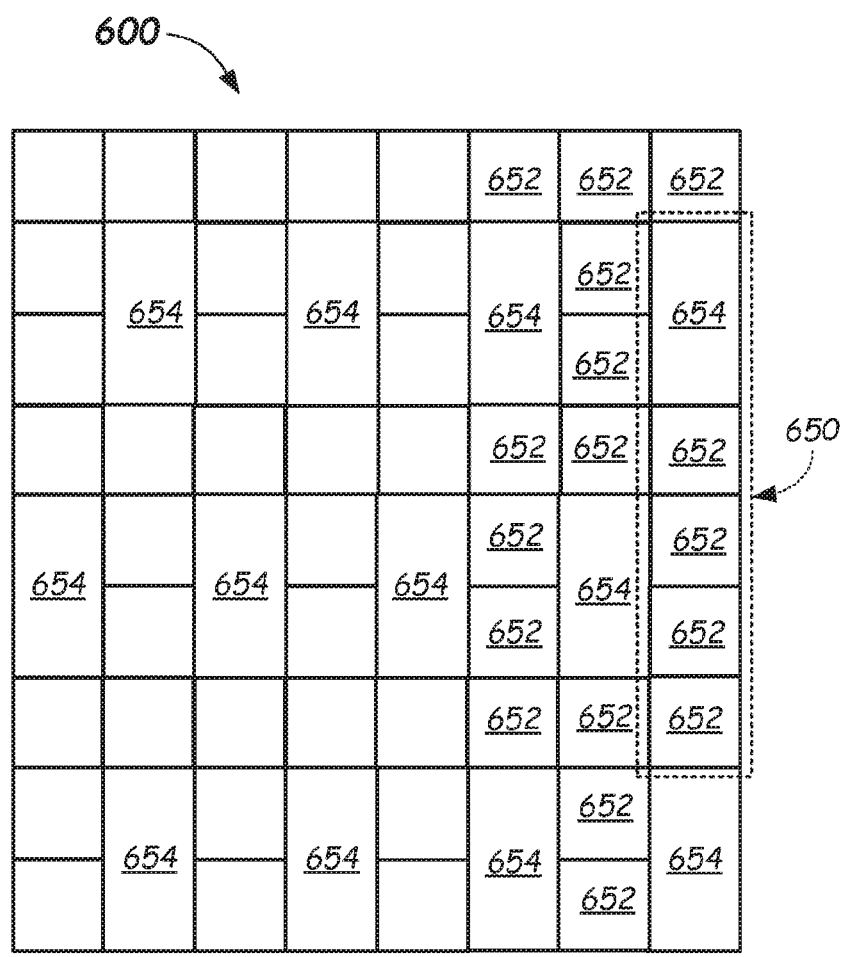
FIG. 6 schematically illustrates a partial end view of another example honeycomb body having a cell structure with a series of interspersed rectangles and squares, wherein the bypass (larger cross-sectional area) channels represent about one third of the total OFA in accordance with this disclosure.

FIG. 6 illustrates another portion of an example honeycomb body 600 (e.g., a ceramic honeycomb body) comprising a unit channel structure 650 comprising combinations of different sized channels, such as a series of rectangles and squares, wherein bypass channels represent about one third of the total available OFA. More particularly, the honeycomb body 600 contains first channels 654 comprising a first hydraulic diameter dh1, and second channels 652 (a few labeled) comprising a second hydraulic diameter dh2 that is smaller than the first hydraulic diameter dh1 (i.e., dh2<dh1). First channels 654 are four-sided large channels, and second channels 652 are four-sided small channels. In this example embodiment, first channels 654 share a common wall with each of six different second channels 652. First channels 654 act as bypass channels because the first hydraulic diameter dh1 is greater than the critical hydraulic diameter dhc. Thus, in this example embodiment, the first hydraulic diameter dh1 is greater than or equal to the critical hydraulic diameter dhc of 1.1 mm (i.e., dh1 dhc), the second hydraulic diameter dh2 is less than the critical hydraulic diameter dhc (i.e., dh2<1.1 mm), and the GSA of first channels 654 and second channels 652, taken together, is greater than or equal to 2.9 $mm^{-1}$. In some embodiments the first hydraulic diameter dh1 may be greater than or equal to 1.15 mm (i.e., dh1≥1.15 mm).

Figure 7:
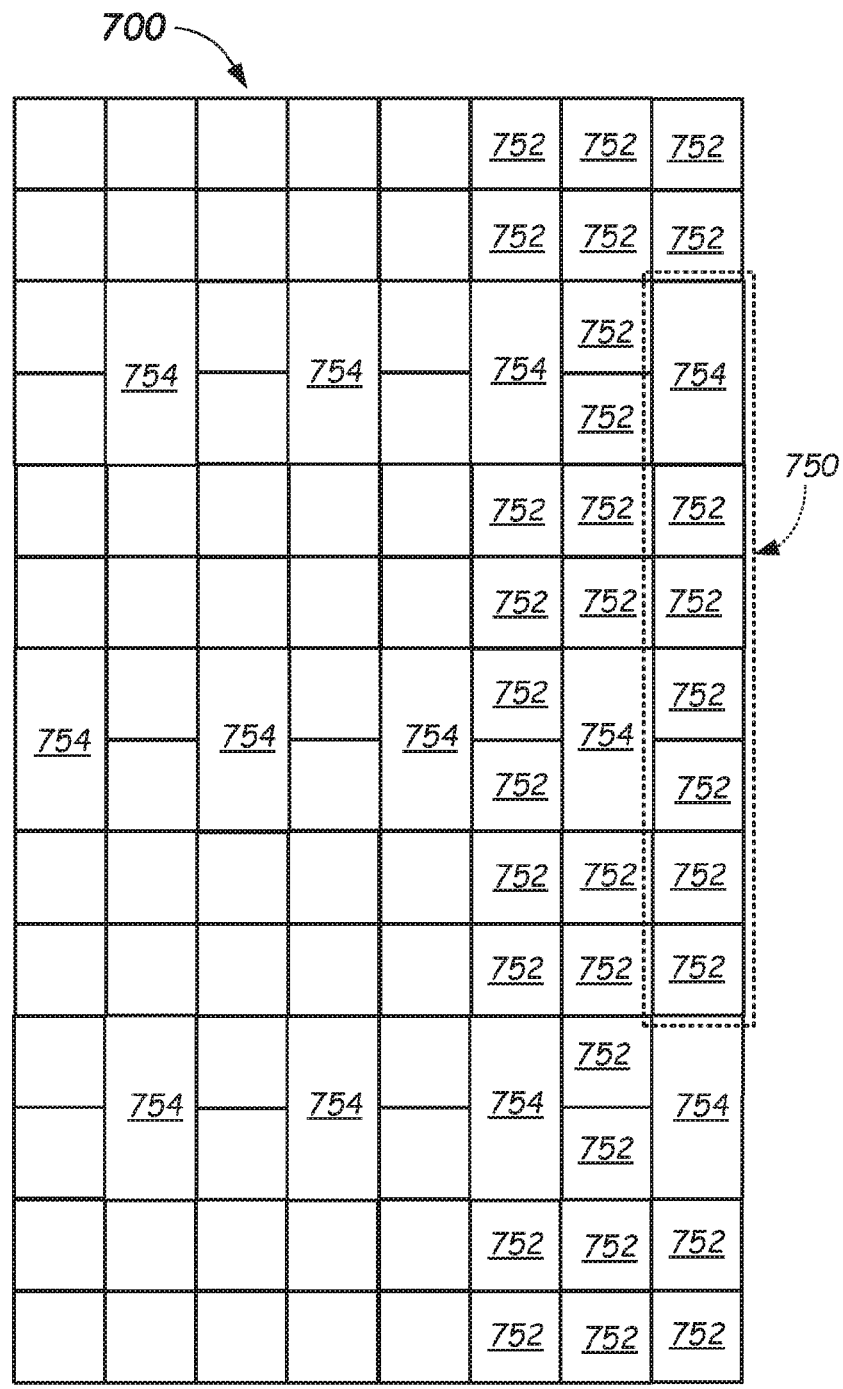
FIG. 7 schematically illustrates a partial end view of another example honeycomb body having a cell structure with a series of rectangles and squares, wherein the bypass (larger cross-sectional area) channels represent about one quarter of the total available OFA in accordance with this disclosure.

FIG. 7 illustrates another example ceramic honeycomb body 700 (e.g., ceramic honeycomb body) containing a plurality of unit channel structures 750 comprising a series of rectangles and squares, where bypass channels represent about one quarter of the total available OFA. More particularly, the honeycomb body 700 comprises first channels 754 having a first hydraulic diameter dh1, and second channels 752 (a few labeled) comprising a second hydraulic diameter dh2 that is smaller than the first hydraulic diameter (dh2<dh1). First channels 754 are four-sided large channels, and second channels 752 are four-sided small channels. In this example embodiment, first channels 754 share a common wall with each of six different second channels 752. First channels 754 act as bypass channels because the first hydraulic diameter dh1 is greater than or equal to the critical hydraulic diameter dhc. In this example embodiment, the first hydraulic diameter dh1 is greater than or equal to dhc (dh1≥1.1 mm), the second hydraulic diameter dh2 is less than dhc (dh2<1.1 mm), and the GSA of first channels 754 and second channels 752, taken together, is greater than or equal to 2.9 $mm^{-1}$. In some embodiments the first hydraulic diameter dh1 can be greater than or equal to 1.15 mm.

Figure 8:
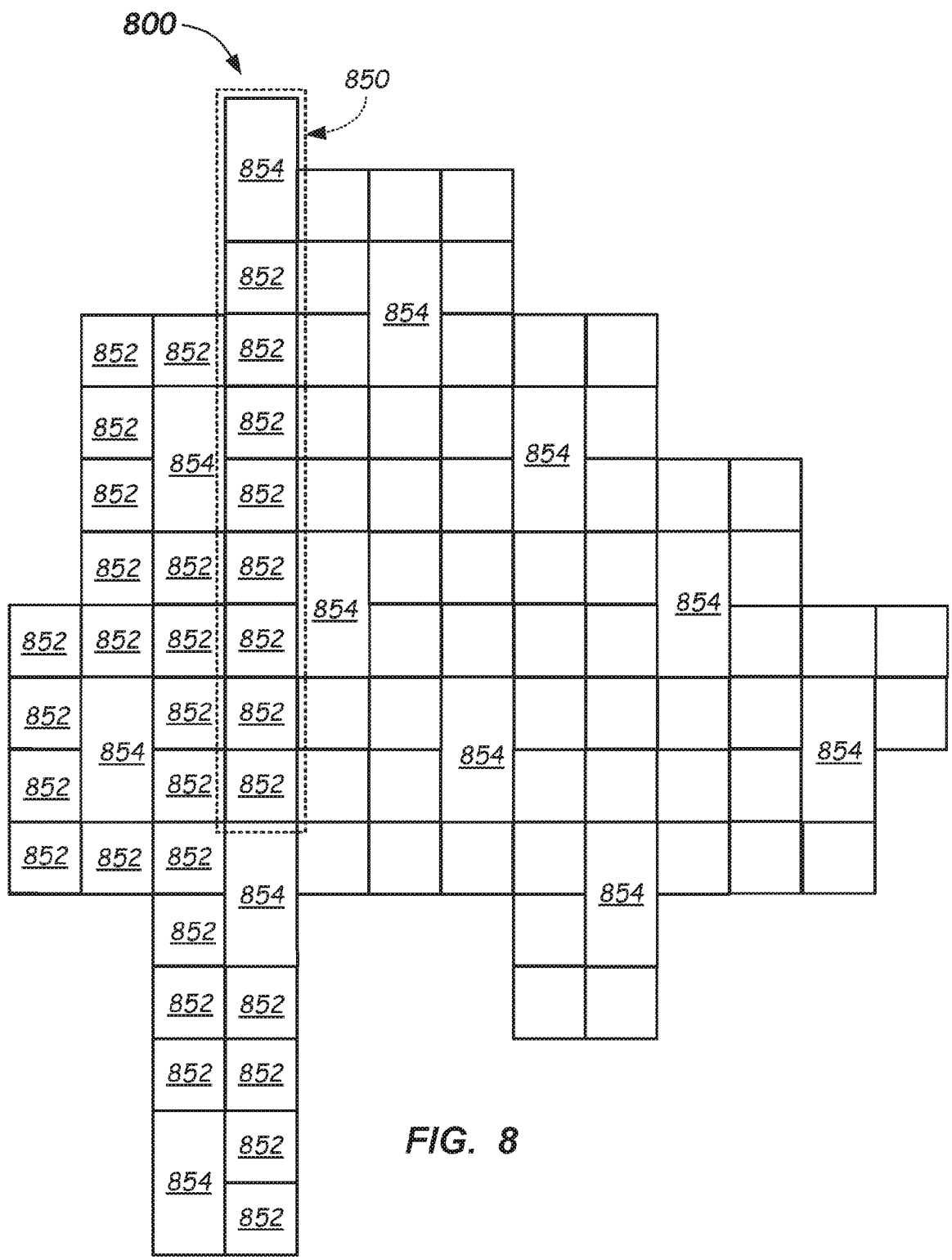
FIG. 8 schematically illustrates a partial end view of another example honeycomb body having a cell structure with a series of rectangles and squares, where bypass (larger cross-sectional area) channels represent about one fifth of the total available OFA.

FIG. 8 illustrates another portion of an example honeycomb body 800 (e.g., ceramic honeycomb body) containing a plurality of unit channel structures 850 comprising a series of rectangles and squares, where bypass channels represent about one fifth of the total available OFA. More particularly, the honeycomb body 800 includes first channels 854 having a first hydraulic diameter dh1, and second channels 852 have a second hydraulic diameter dh2 that is smaller than the first hydraulic diameter dh1. First channels 854 are four-sided large channels (e.g., rectangles), and second channels 852 are four-sided small channels (e.g., squares).

In this example embodiment, first channels 854 share a common wall with each of six different second channels 852. First channels 854 act as the bypass channels because the first hydraulic diameter dh1 is greater than or equal to the critical hydraulic diameter dhc. In this embodiment, the first hydraulic diameter dh1 is greater than or equal to dhc (i.e., dh1≥1.1 mm), the second hydraulic diameter dh2 is less than dhc (i.e., dh2<1.1 mm), and the GSA of first channels 854 and second channels 852 taken together is greater than or equal to 2.9 $mm^{-1}$. In some embodiments the first hydraulic diameter dh1 may be greater than or equal to 1.15 mm.

Figures 9, 10:
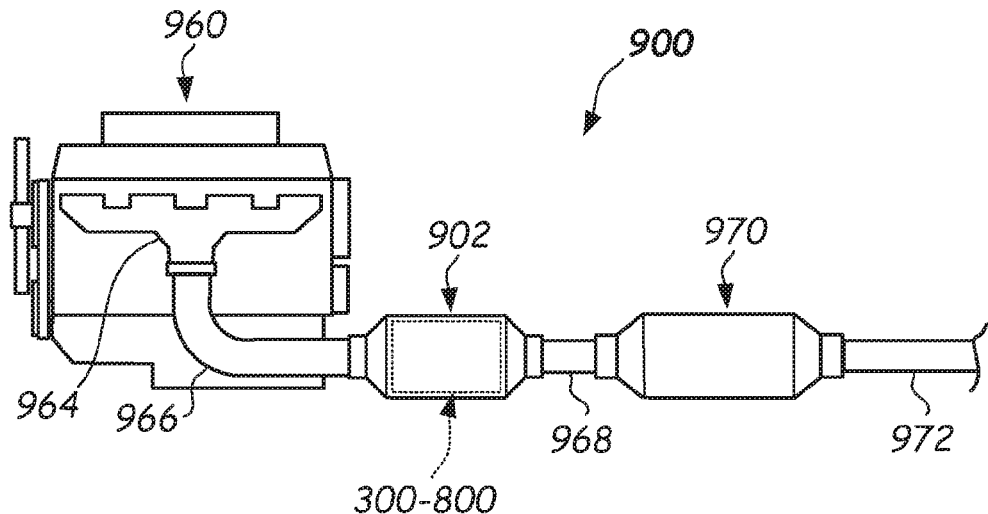
FIG. 9 schematically illustrates a side view of an example internal combustion engine exhaust system containing a catalytic converter in accordance with this disclosure.
FIG. 10 illustrates a flowchart of an example method of reducing face-plugging in accordance with this disclosure.

As described above, various embodiments in accordance with this disclosure may be used in an exhaust system 900 of a vehicle. FIG. 9 illustrates a schematic side view of an example internal combustion engine exhaust system 500, such as those found in vehicles, containing a catalytic converter in accordance with this disclosure. More particularly, FIG. 9 illustrates an exhaust system 900 coupled to an engine 960 (e.g., a gasoline engine or diesel engine). Exhaust system 900 can comprise a manifold 964 for coupling to the exhaust ports of the engine 960, a first collection tube 966 configured to couple between manifold 964 and the catalytic converter 902 containing therein a honeycomb body (e.g., any one of the honeycomb bodies 300-800) comprising a first plurality of flow-through channels having a first hydraulic diameter and a second plurality of flow-through channels having a second hydraulic diameter that is smaller than the first hydraulic diameter. Additional smaller flow-through channels having hydraulic diameters that are smaller than the first hydraulic diameter, but different than the second hydraulic diameter may be present. Coupling may be by any suitable clamping bracket or other attachment mechanism. The first collection tube 966 may be integral with manifold 964 in some embodiments. In some embodiments, catalytic converter 902 may couple directly to the manifold without an intervening member. Exhaust system 900 may further comprise a second collection tube 968 coupled to the catalytic converter 902 and to a second exhaust component 970. The second exhaust component 970 can comprise a particulate filter comprising a plugged honeycomb body, or another catalytic converter, or a muffler, or combinations thereof, for example. A tailpipe 972 (shown truncated) or other conduit or component may be coupled to the second exhaust component 970. Other exhaust system components may be included, such as a muffler, one or more oxygen or other sensors, ports for urea injection, and the like (not shown).

FIG. 10 illustrates a flowchart of an example method of reducing face-plugging of a honeycomb body (e.g., honeycomb bodies 300-800). The example method 1000 of reducing face-plugging comprises, at 1002, providing a flow-through honeycomb body (e.g., any one of honeycomb bodies 300-800 or the like) comprising large channels (e.g., large channels 254, 454, 554, 654, 754, 854) and small channels (e.g., small channels 252, 256, 258, 452, 552, 652, 752, 852) the large channels having a hydraulic diameter dh greater than or equal to 1.1 mm, the small channels having a hydraulic diameter dh less than 1.1 mm, and the large channels and small channels, taken together, have a geometric surface area GSA greater than or equal to 2.9 $mm^{-1}$. By providing large channels that are too large to be appreciably bridged by particulates in the exhaust stream a gas flow path remains open even when smaller channels may suffer from face-plugging. And, by providing smaller channels the catalytic efficiency per unit volume is increased, thereby allowing a DOC to be made smaller. The combination of large channels and small channels, in accordance with this disclosure provides a small form factor catalytic converter that is also resistant to face-plugging. In various embodiments, the large channels and the small channels extend in parallel between an inlet face and an outlet face of the honeycomb body (e.g., honeycomb body 300-800).

Example method 1000 further comprises, at 1004, flowing soot-laden exhaust gas through the large and small channels wherein the large channels act as bypass channels thereby reducing face-plugging of the flow-through honeycomb body.

Still referring to example method 1000, the honeycomb body 300-800 may have a combined channel density CD of the large and small channels of at least 62 channels/cm² (400 cpsi), and the large channels, taken alone, may have a channel density CD between 6.2 channels/cm² (40 cpsi) and 46.5 channels/cm² (300 cpsi). Additionally, a channel ratio CR of the total cross-sectional area of the large channels to the total cross-sectional area of the large channels and the small channels, taken together, is in a range from 3% to 40%.

Modeling results are shown in Tables 1-4 below and show significant pressure drop improvement with flow-through honeycomb bodies having a first portion of channels having a hydraulic diameter dh greater than or equal to the critical hydraulic diameter dhc, and a second portion of channels having a hydraulic diameter dh less than the critical hydraulic diameter dhc as compared to convention flow-through honeycomb bodies. Additionally, the modeling results further show that the ceramic honeycomb bodies in accordance with this disclosure provide improvements on GSA once face-plugging starts to occur.

TABLE 1

| Parameter | Comp. Ex. 1 | Comp. Ex. 2 | Comp. Ex. 3 | Comp. Ex. 4 | Comp. Ex. 5 |
|---|---|---|---|---|---|
| Substrate diameter (inch) | 5.66 | 5.66 | 5.66 | 5.66 | 5.66 |
| Substrate length (inch) | 6 | 6 | 6 | 6 | 6 |
| Major area (area1) (cpsi) | 450 | 600 | 600 | 900 | 900 |
| Major area (area1) (%) | 100 | 100 | 100 | 100 | 100 |
| Minor area (area2) (cpsi) | 450 | 600 | 600 | 900 | 900 |
| Minor area (area2) (%) | 0 | 0 | 0 | 0 | 0 |
| Wall thickness (mil) | 3 | 3 | 4 | 3 | 2 |
| Small Cell area (area1) surface area/volume (in²/in³) | 79.5 | 90.8 | 88.4 | 109.2 | 112.8 |
| Large Cell area (area2) surface area/volume (in²/in³) | 0.0 | 0.0 | 0.0 | 0.0 | 0.0 |
| Total area (area1 + area2) surface area/volume (in²/in³) | 79.5 | 90.8 | 88.4 | 109.2 | 112.8 |
| Fraction of small cells blocked | 0.0 | 0.0 | 0.0 | 0.0 | 0.0 |
| % of surface area/volume vs. for same small cell size comparative example surface area/volume | 100 | 100 | 100 | 100 | 100 |
| Temp. (° C.) | 450 | 450 | 450 | 450 | 450 |
| Mass flow rate (kg/hr) | 75 | 75 | 75 | 75 | 75 |
| Total Pressure Drop (Pa) | 368.9 | 506.2 | 563.4 | 804.9 | 706.9 |
| % improvement vs. comp. example pressure drop for same small cell cpsi | 0 | 0 | 0 | 0 | 0 |
| % of pressure drop vs. comp. example pressure drop for same small cell cpsi | 100 | 100 | 100 | 100 | 100 |
| Substrate diameter (cm) | 14.38 | 14.38 | 14.38 | 14.38 | 14.38 |
| Substrate length (cm) | 15.24 | 15.24 | 15.24 | 15.24 | 15.24 |
| Mass flow rate (gram/sec) | 20.83 | 20.83 | 20.83 | 20.83 | 20.83 |
| Wall thickness (cm) | 0.00762 | 0.00762 | 0.01016 | 0.00762 | 0.00508 |
| Hydraulic diameter of small cells (area1), cm | 0.11 | 0.10 | 0.09 | 0.08 | 0.08 |
| Hydraulic diameter of large cells (area1), cm | 0.11 | 0.10 | 0.09 | 0.08 | 0.08 |
| Small Cells, Area Fraction | 1 | 1 | 1 | 1 | 1 |
| Large Cells, Area Fraction | 0 | 0 | 0 | 0 | 0 |
| Pressure, atmosphere | 1 | 1 | 1 | 1 | 1 |
| Temp, ° K | 723 | 723 | 723 | 723 | 723 |
| Gas density (gram/cm³) | 4.89E−04 | 4.89E−04 | 4.89E−04 | 4.89E−04 | 4.89E−04 |
| Flow rate (cm3/sec) | 42616 | 42616 | 42616 | 42616 | 42616 |
| Kinematic viscosity, cm²/sec | 0.691 | 0.691 | 0.691 | 0.691 | 0.691 |
| Dynamic Viscosity, gram/sec-cm | 3.38E−04 | 3.38E−04 | 3.38E−04 | 3.38E−04 | 3.38E−04 |
| Flow rate through large channels (cm3/sec) | 42616 | 42616 | 42616 | 42616 | 42616 |
| Flow rate through small channels (cm3/sec) | 0 | 0 | 0 | 0 | 0 |
| Channel pressure drop (Pa) | 349.1 | 485.6 | 540.5 | 782.7 | 687.5 |
| Average hydraulic diameter (cm) | 0.112 | 0.096 | 0.094 | 0.077 | 0.080 |

TABLE 1-continued

Comparative Ex. 1 through Ex. 5

| Parameter | Comp. Ex. 1 | Comp. Ex. 2 | Comp. Ex. 3 | Comp. Ex. 4 | Comp. Ex. 5 |
|---|---|---|---|---|---|
| Average inlet and outlet Reynolds number | 12.1 | 10.6 | 10.9 | 8.8 | 8.6 |
| Parameter Zi for inlet and outlet pressure drop | 4.5 | 4.5 | 4.5 | 4.5 | 4.5 |
| Inlet and outlet pressure drop (Pa) | 19.7 | 20.6 | 22.9 | 22.1 | 19.4 |

TABLE 2

Inventive Ex. 1 through Ex. 6

| Parameter | Ex. 1 | Ex. 2 | Ex. 3 | Ex. 4 | Ex. 5 | Ex. 6 |
|---|---|---|---|---|---|---|
| Substrate diameter, inches | 5.66 | 5.66 | 5.66 | 5.66 | 5.66 | 5.66 |
| Substrate length, inches | 6 | 6 | 6 | 6 | 6 | 6 |
| Major area (area1), cpsi | 450 | 450 | 450 | 600 | 600 | 600 |
| Major area (area1), % | 90 | 80 | 70 | 95 | 97 | 90 |
| Minor area (area2), cpsi | 200 | 200 | 200 | 200 | 200 | 200 |
| Minor area (area2), % | 10 | 20 | 30 | 5 | 3 | 10 |
| Wall thickness, mil | 3 | 3 | 3 | 3 | 3 | 3 |
| Small cell area (area1) surface area/volume, in2/in3 | 71.5 | 63.6 | 55.6 | 86.2 | 88.1 | 81.7 |
| Large cell area (area2) surface area/volume, in2/in3 | 5.4 | 10.8 | 16.3 | 2.7 | 1.6 | 5.4 |
| Total area (area1 + area2) surface area/volume, in2/in3 | 76.9 | 74.4 | 71.9 | 88.9 | 89.7 | 87.1 |
| Fraction of small cells blocked | 0.0 | 0.0 | 0.0 | 0.0 | 0.0 | 0.0 |
| % of surface area/volume vs. for same small cell size comparative example surface area/volume | 96.8 | 93.6 | 90.5 | 98.0 | 98.8 | 96.0 |
| Temp, ° C. | 450 | 450 | 450 | 450 | 450 | 450 |
| Mass flow rate, kg/hr | 75 | 75 | 75 | 75 | 75 | 75 |
| Total Pressure Drop, Pa | 258.1 | 199.7 | 163.5 | 350.7 | 399.5 | 269.4 |
| % improvement vs. comparative example pressure drop for same small cell cpsi | 30.0 | 45.9 | 55.7 | 30.7 | 21.1 | 46.8 |
| % of pressure drop vs. comparative example pressure drop for same small cell cpsi | 70.0 | 54.1 | 44.3 | 69.3 | 78.9 | 53.2 |
| Substrate diameter, cm | 14.38 | 14.38 | 14.38 | 14.38 | 14.38 | 14.38 |
| Substrate length, cm | 15.24 | 15.24 | 15.24 | 15.24 | 15.24 | 15.24 |
| Mass flow rate, gram/sec | 20.83 | 20.83 | 20.83 | 20.83 | 20.83 | 20.83 |
| Wall thickness, cm | 0.00762 | 0.00762 | 0.00762 | 0.00762 | 0.00762 | 0.00762 |
| Hydraulic diameter of small cells (area1), cm | 0.11 | 0.11 | 0.11 | 0.11 | 0.11 | 0.11 |
| Hydraulic diameter of large cells (area1), cm | 0.17 | 0.17 | 0.17 | 0.17 | 0.17 | 0.17 |
| Small Cells, Area Fraction | 0.9 | 0.8 | 0.7 | 0.95 | 0.97 | 0.9 |
| Large Cells, Area Fraction | 0.1 | 0.2 | 0.3 | 0.05 | 0.03 | 0.1 |
| Pressure, atmosphere | 1 | 1 | 1 | 1 | 1 | 1 |
| Temp, ° K | 723 | 723 | 723 | 723 | 723 | 723 |
| Gas density (gram/cm3) | 4.89E−04 | 4.89E−04 | 4.89E−04 | 4.89E−04 | 4.89E−04 | 4.89E−04 |
| Flow rate (cm3/sec) | 42616 | 42616 | 42616 | 42616 | 42616 | 42616 |
| Kinematic viscosity, cm$^2$/sec | 0.691 | 0.691 | 0.691 | 0.691 | 0.691 | 0.691 |
| Dynamic Viscosity, gram/sec-cm | 3.38E−04 | 3.38E−04 | 3.38E−04 | 3.38E−04 | 3.38E−04 | 3.38E−04 |
| Flow rate through large channels (cm3/sec) | 26384 | 17874 | 12634 | 27665 | 32344 | 19905 |
| Flow rate through small channels (cm3/sec) | 16232 | 24742 | 29982 | 14952 | 10272 | 22711 |
| Channel pressure drop, Pa | 240.2 | 183.0 | 147.9 | 331.8 | 380.0 | 252.0 |
| Average hydraulic diameter, cm | 0.118 | 0.124 | 0.130 | 0.100 | 0.098 | 0.104 |
| Average inlet and outlet Reynolds number | 12.2 | 12.3 | 12.6 | 10.6 | 10.6 | 10.6 |
| Parameter Zi for inlet and outlet pressure drop | 4.5 | 4.5 | 4.5 | 4.5 | 4.5 | 4.5 |
| Inlet and outlet pressure drop, Pa | 18.0 | 16.6 | 15.7 | 18.9 | 19.5 | 17.4 |

TABLE 2-continued

| Inventive Ex. 7 through Ex. 12 | | | | | | |
|---|---|---|---|---|---|---|
| Parameter | Ex. 7 | Ex. 8 | Ex. 9 | Ex. 10 | Ex. 11 | Ex. 12 |
| Substrate diameter, inches | 5.66 | 5.66 | 5.66 | 5.66 | 5.66 | 5.66 |
| Substrate length, inches | 6 | 6 | 6 | 6 | 6 | 6 |
| Major area (area1), cpsi | 600 | 600 | 900 | 900 | 600 | 600 |
| Major area (area1), % | 80 | 70 | 90 | 80 | 70 | 90 |
| Minor area (area2), cpsi | 200 | 200 | 200 | 200 | 200 | 100 |
| Minor area (area2), % | 20 | 30 | 10 | 20 | 30 | 10 |
| Wall thickness, mil | 3 | 3 | 3 | 3 | 3 | 3 |
| Small cell area (area1) surface area/volume, in2/in3 | 72.6 | 63.5 | 98.3 | 87.4 | 76.4 | 81.7 |
| Large cell area (area2) surface area/volume, in2/in3 | 10.8 | 16.3 | 5.4 | 10.8 | 16.3 | 3.9 |
| Total area (area1 + area2) surface area/volume, in2/in3 | 83.5 | 79.8 | 103.7 | 98.2 | 92.7 | 85.6 |
| Fraction of small cells blocked | 0.0 | 0.0 | 0.0 | 0.0 | 0.0 | 0.0 |
| % of surface area/volume vs. for same small cell size comparative example surface area/volume | 91.9 | 87.9 | 95.0 | 89.9 | 84.9 | 94.3 |
| Temp, ° C. | 450 | 450 | 450 | 450 | 450 | 450 |
| Mass flow rate, kg/hr | 75 | 75 | 75 | 75 | 75 | 75 |
| Total Pressure Drop, Pa | 185.4 | 142.2 | 247.7 | 148.6 | 106.7 | 106.6 |
| % improvement vs. comparative example pressure drop for same small cell cpsi | 63.4 | 71.9 | 69.2 | 81.5 | 86.7 | 71.1 |
| % of pressure drop vs. comparative example pressure drop for same small cell cpsi | 36.6 | 28.1 | 30.8 | 18.5 | 13.3 | 28.9 |
| Substrate diameter, cm | 14.38 | 14.38 | 14.38 | 14.38 | 14.38 | 14.38 |
| Substrate length, cm | 15.24 | 15.24 | 15.24 | 15.24 | 15.24 | 15.24 |
| Mass flow rate, gram/sec | 20.83 | 20.83 | 20.83 | 20.83 | 20.83 | 20.83 |
| Wall thickness, cm | 0.00762 | 0.00762 | 0.00762 | 0.00762 | 0.00762 | 0.00762 |
| Hydraulic diameter of small cells (area1), cm | 0.10 | 0.10 | 0.08 | 0.08 | 0.08 | 0.10 |
| Hydraulic diameter of large cells (area1), cm | 0.17 | 0.17 | 0.17 | 0.17 | 0.17 | 0.25 |
| Small Cells, Area Fraction | 0.8 | 0.7 | 0.9 | 0.8 | 0.7 | 0.9 |
| Large Cells, Area Fraction | 0.2 | 0.3 | 0.1 | 0.2 | 0.3 | 0.1 |
| Pressure, atmosphere | 1 | 1 | 1 | 1 | 1 | 1 |
| Temp, ° K | 723 | 723 | 723 | 723 | 723 | 723 |
| Gas density (gram/cm3) | 4.89E−04 | 4.89E−04 | 4.89E−04 | 4.89E−04 | 4.89E−04 | 4.89E−04 |
| Flow rate (cm3/sec) | 42616 | 42616 | 42616 | 42616 | 42616 | 42616 |
| Kinematic viscosity, cm$^2$/sec | 0.691 | 0.691 | 0.691 | 0.691 | 0.691 | 0.691 |
| Dynamic Viscosity, gram/sec-cm | 3.38E−04 | 3.38E−04 | 3.38E−04 | 3.38E−04 | 3.38E−04 | 3.38E−04 |
| Flow rate through large channels (cm3/sec) | 11947 | 7891 | 11338 | 5913 | 3661 | 7341 |
| Flow rate through small channels (cm3/sec) | 30670 | 34726 | 31278 | 36703 | 38956 | 35276 |
| Channel pressure drop, Pa | 170.2 | 128.4 | 231.4 | 135.8 | 96.1 | 92.9 |
| Average hydraulic diameter, cm | 0.111 | 0.119 | 0.087 | 0.096 | 0.106 | 0.111 |
| Average inlet and outlet Reynolds number | 10.6 | 10.7 | 8.5 | 8.4 | 8.4 | 10.0 |
| Parameter Zi for inlet and outlet pressure drop | 4.5 | 4.5 | 4.5 | 4.5 | 4.5 | 4.5 |
| Inlet and outlet pressure drop, Pa | 15.2 | 13.7 | 16.3 | 12.8 | 10.7 | 13.7 |

| Inventive Ex. 13 through 18 | | | | | | |
|---|---|---|---|---|---|---|
| Parameter | Ex. 13 | Ex. 14 | Ex. 15 | Ex. 16 | Ex. 17 | Ex. 18 |
| Substrate diameter, inches | 5.66 | 5.66 | 5.66 | 5.66 | 5.66 | 5.66 |
| Substrate length, inches | 6 | 6 | 6 | 6 | 6 | 6 |
| Major area (area1), cpsi | 600 | 600 | 900 | 900 | 600 | 900 |
| Major area (area1), % | 80 | 90 | 80 | 90 | 80 | 95 |
| Minor area (area2), cpsi | 100 | 50 | 100 | 50 | 200 | 200 |
| Minor area (area2), % | 20 | 10 | 20 | 10 | 20 | 5 |
| Wall thickness, mil | 3 | 3 | 3 | 3 | 3 | 3 |
| Small cell area (area1) surface area/volume, in2/in3 | 72.6 | 81.7 | 87.4 | 98.3 | 70.7 | 107.2 |
| Large cell area (area2) surface area/volume, in2/in3 | 7.8 | 2.8 | 7.8 | 2.8 | 10.7 | 2.7 |
| Total area (area1 + area2) surface area/volume, in2/in3 | 80.4 | 84.5 | 95.1 | 101.0 | 81.4 | 109.9 |

TABLE 2-continued

| | | | | | | |
|---|---|---|---|---|---|---|
| Fraction of small cells blocked | 0.0 | 0.0 | 0.0 | 0.0 | 0.0 | 0.0 |
| % of surface area/volume vs. for same small cell size comparative example surface area/volume | 88.5 | 93.0 | 87.1 | 92.5 | 92.1 | 97.4 |
| Temp, °C. | 450 | 450 | 450 | 450 | 450 | 450 |
| Mass flow rate, kg/hr | 75 | 75 | 75 | 75 | 75 | 75 |
| Total Pressure Drop, Pa | 61.4 | 35.5 | 43.7 | 25.7 | 199.7 | 343.1 |
| % improvement vs. comparative example pressure drop for same small cell cpsi | 83.4 | 90.4 | 94.6 | 96.8 | 64.6 | 51.5 |
| % of pressure drop vs. comparative example pressure drop for same small cell cpsi | 16.6 | 9.6 | 5.4 | 3.2 | 35.4 | 48.5 |
| Substrate diameter, cm | 14.38 | 14.38 | 14.38 | 14.38 | 14.38 | 14.38 |
| Substrate length, cm | 15.24 | 15.24 | 15.24 | 15.24 | 15.24 | 15.24 |
| Mass flow rate, gram/sec | 20.83 | 20.83 | 20.83 | 20.83 | 20.83 | 20.83 |
| Wall thickness, cm | 0.00762 | 0.00762 | 0.00762 | 0.00762 | 0.00762 | 0.00762 |
| Hydraulic diameter of small cells (area1), cm | 0.10 | 0.10 | 0.08 | 0.08 | 0.09 | 0.08 |
| Hydraulic diameter of large cells (area2), cm | 0.25 | 0.35 | 0.25 | 0.35 | 0.17 | 0.17 |
| Small Cells, Area Fraction | 0.8 | 0.9 | 0.8 | 0.9 | 0.8 | 0.95 |
| Large Cells, Area Fraction | 0.2 | 0.1 | 0.2 | 0.1 | 0.2 | 0.05 |
| Pressure, atmosphere | 1 | 1 | 1 | 1 | 1 | 1 |
| Temp, °K | 723 | 723 | 723 | 723 | 723 | 723 |
| Gas density (gram/cm3) | 4.89E−04 | 4.89E−04 | 4.89E−04 | 4.89E−04 | 4.89E−04 | 4.89E−04 |
| Flow rate (cm3/sec) | 42616 | 42616 | 42616 | 42616 | 42616 | 42616 |
| Kinematic viscosity, cm$^2$/sec | 0.691 | 0.691 | 0.691 | 0.691 | 0.691 | 0.691 |
| Dynamic Viscosity, gram/sec-cm | 3.38E−04 | 3.38E−04 | 3.38E−04 | 3.38E−04 | 3.38E−04 | 3.38E−04 |
| Flow rate through large channels (cm3/sec) | 3608 | 2036 | 1570 | 886 | 11541 | 19222 |
| Flow rate through small channels (cm3/sec) | 39009 | 40580 | 41046 | 41750 | 31075 | 23395 |
| Channel pressure drop, Pa | 61.4 | 25.8 | 36.0 | 17.7 | 183.0 | 326.4 |
| Average hydraulic diameter, cm | 0.126 | 0.122 | 0.111 | 0.105 | 0.109 | 0.084 |
| Average inlet and outlet Reynolds number | 9.7 | 9.2 | 7.5 | 7.2 | 10.8 | 8.4 |
| Parameter Zi for inlet and outlet pressure drop | 4.5 | 4.5 | 4.5 | 4.5 | 4.5 | 4.5 |
| Inlet and outlet pressure drop, Pa | 10.0 | 9.7 | 7.6 | 8.0 | 16.7 | 16.7 |

| Inventive Ex. 19 through Ex. 21 | | | |
|---|---|---|---|
| Parameter | Ex. 19 | Ex. 20 | Ex. 21 |
| Substrate diameter, inches | 5.66 | 5.66 | 5.66 |
| Substrate length, inches | 6 | 6 | 6 |
| Major area (area1), cpsi | 900 | 600 | 900 |
| Major area (area1), % | 95 | 75 | 75 |
| Minor area (area2), cpsi | 200 | 200 | 200 |
| Minor area (area2), % | 20 | 30 | 10 |
| Wall thickness, mil | 3 | 3 | 3 |
| Small cell area (area1) surface area/volume, in2/in3 | 72.6 | 63.5 | 98.3 |
| Large cell area (area2) surface area/volume, in2/in3 | 10.8 | 16.3 | 5.4 |
| Total area (area1 + area2) surface area/volume, in2/in3 | 83.5 | 79.8 | 103.7 |
| Fraction of small cells blocked | 0.0 | 0.0 | 0.0 |
| % of surface area/volume vs for same small cell size comparative example surface area/volume | 98.0 | 88.0 | 88.1 |
| Temp, °C. | 450 | 450 | 450 |
| Mass flow rate, kg/hr | 75 | 75 | 75 |
| Total Pressure Drop, Pa | 633.4 | 265.1 | 411.4 |
| % improvement vs. comparative example pressure drop for same small cell cpsi | 10.4 | 47.6 | 48.9 |
| % of pressure drop vs. comparative example pressure drop for same small cell cpsi | 89.6 | 52.4 | 51.1 |
| Substrate diameter, cm | 14.38 | 14.38 | 14.38 |
| Substrate length, cm | 15.24 | 15.24 | 15.24 |
| Mass flow rate, gram/sec | 20.83 | 20.83 | 20.83 |

TABLE 2-continued

| | | | |
|---|---|---|---|
| Wall thickness, cm | 0.00508 | 0.00762 | 0.00762 |
| Hydraulic diameter of small cells (area1), cm | 0.08 | 0.10 | 0.08 |
| Hydraulic diameter of large cells (area2), cm | 0.14 | 0.20 | 0.16 |
| Small Cells, Area Fraction | 0.95 | 0.75 | 0.75 |
| Large Cells, Area Fraction | 0.05 | 0.25 | 0.25 |
| Pressure, atmosphere | 1 | 1 | 1 |
| Temp, ° K | 723 | 723 | 723 |
| Gas density (gram/cm3) | 4.89E−04 | 4.89E−04 | 4.89E−04 |
| Flow rate (cm3/sec) | 42616 | 42616 | 42616 |
| Kinematic viscosity, $cm^2$/sec | 0.691 | 0.691 | 0.691 |
| Dynamic Viscosity, gram/sec-cm | 3.38E−04 | 3.38E−04 | 3.38E−04 |
| Flow rate through large channels (cm3/sec) | 6367 | 25955 | 26334 |
| Flow rate through small channels (cm3/sec) | 36250 | 16662 | 16283 |
| Channel pressure drop, Pa | 615.6 | 253.1 | 398.8 |
| Average hydraulic diameter, cm | 0.083 | 0.122 | 0.098 |
| Average inlet and outlet Reynolds number | 8.5 | 10.3 | 8.5 |
| Parameter $Z_i$ for inlet and outlet pressure drop | 4.5 | 4.5 | 4.5 |
| Inlet and outlet pressure drop, Pa | 17.8 | 12.0 | 12.7 |

TABLE 3

Comparative Examples 1 through 5

| Parameter | Comp. Ex. 1 | Comp. Ex. 2 | Comp. Ex. 3 | Comp. Ex. 4 | Comp. Ex. 5 |
|---|---|---|---|---|---|
| Substrate diameter, inches | 5.66 | 5.66 | 5.66 | 5.66 | 5.66 |
| Substrate length, inches | 6 | 6 | 6 | 6 | 6 |
| Major area (area1), cpsi | 450 | 600 | 600 | 900 | 900 |
| Major area (area1), % | 100 | 100 | 100 | 100 | 100 |
| Minor area (area2), cpsi | 450 | 600 | 600 | 900 | 900 |
| Minor area (area2), % | 0 | 0 | 0 | 0 | 0 |
| Wall thickness, mil | 3 | 3 | 4 | 3 | 2 |
| Fraction of small cells (area1) blocked | 0.0 | 0.0 | 0.0 | 0.0 | 0.0 |
| Total Pressure Drop (0% area1 blocked), Pa | 369 | 506 | 563 | 805 | 707 |
| Total area (area1 + area2) surface area/volume, in2/in3 | 79.5 | 90.8 | 88.4 | 109.2 | 112.8 |
| % of surface area/volume vs. for same small cell size (area1) comparative example surface area/volume (0% blocked) | 100 | 100 | 100 | 100 | 100 |
| % improvement in pressure drop vs. comparative example pressure drop for same small cell area (area1) cpsi, (0% area1 blocked) | 0.0 | 0.0 | 0.0 | 0.0 | 0.0 |
| Fraction of small cells (area1) blocked | 0.10 | 0.10 | 0.10 | 0.10 | 0.10 |
| Total Pressure Drop (10% area1 blocked), Pa | 425 | 578 | 644 | 911 | 800 |
| Total area (area1 + area2) surface area/volume, in2/in3 (10% area1 blocked | 71.5 | 81.7 | 79.5 | 98.3 | 101.5 |
| % of surface area/volume vs. for same small cell size (area1) comparative example surface area/volume (10% area1 blocked) | 100 | 100 | 100 | 100 | 100 |
| % improvement in pressure drop vs. comparative example pressure drop for same small cell area (area1) cpsi, (10% area1 blocked) | 0 | 0 | 0 | 0 | 0 |
| Fraction of small cells (area1) blocked | 0.20 | 0.20 | 0.20 | 0.20 | 0.20 |
| Total Pressure Drop (20% area1 blocked), Pa | 512 | 686 | 763 | 1063 | 933 |

TABLE 3-continued

| | Comparative Examples 1 through 5 | | | | |
|---|---|---|---|---|---|
| Parameter | Comp. Ex. 1 | Comp. Ex. 2 | Comp. Ex. 3 | Comp. Ex. 4 | Comp. Ex. 5 |
| Total area (area1 + area2) surface area/volume, in2/in3 (20% area1 blocked | 63.6 | 72.6 | 70.7 | 87.4 | 90.2 |
| % of surface area/volume vs. for same small cell size (area1) comparative example surface area/volume (20% area1 blocked) | 100 | 100 | 100 | 100 | 100 |
| % improvement in pressure drop vs. comparative example pressure drop for same small cell area (area1) cpsi, (20% area1 blocked) | 0 | 0 | 0 | 0 | 0 |
| Fraction of small cells (area1) blocked | 0.30 | 0.30 | 0.30 | 0.30 | 0.30 |
| Total Pressure Drop (30% area1 blocked), Pa | 666 | 869 | 967 | 1306 | 1147 |
| Total area (area1 + area2) surface area/volume, in2/in3 (30% area1 blocked | 55.6 | 63.5 | 61.9 | 76.4 | 79.0 |
| % of surface area/volume vs. for same small cell size (area1) comparative example surface area/volume (30% area1 blocked) | 100 | 100 | 100 | 100 | 100 |
| % improvement in pressure drop vs. comparative example pressure drop for same small cell area (area1) cpsi, (30% area1 blocked) | 0 | 0 | 0 | 0 | 0 |
| Fraction of small cells (area1) blocked | 0.40 | 0.40 | 0.40 | 0.40 | 0.40 |
| Total Pressure Drop (40% area1 blocked), Pa | 1005 | 1250 | 1392 | 1778 | 1562 |
| Total area (area1 + area2) surface area/volume, in2/in3 (40% area1 blocked | 47.7 | 54.2 | 53.0 | 65.5 | 67.7 |
| % of surface area/volume vs. for same small cell size (area1) comparative example surface area/volume (40% area1 blocked) | 100 | 100 | 100 | 100 | 100 |
| % improvement in pressure drop vs. comparative example pressure drop for same small cell area (area1) cpsi, (40% area1 blocked) | 0 | 0 | 0 | 0 | 0 |
| Fraction of small cells (area1) blocked | 0.50 | 0.50 | 0.50 | 0.50 | 0.50 |
| Total Pressure Drop (50% area1 blocked), Pa | 1961 | 2288 | 2547 | 2981 | 2618 |
| Total area (area1 + area2) surface area/volume, in2/in3 (50% area1 blocked | 39.7 | 45.4 | 44.2 | 54.6 | 56.4 |
| % of surface area/volume vs. for same small cell size (area1) comparative example surface area/volume (50% area1 blocked) | 100 | 100 | 100 | 100 | 100 |
| % improvement in pressure drop vs. comparative example pressure drop for same small cell area (area1) cpsi, (50% area1 blocked) | 0 | 0 | 0 | 0 | 0 |
| Fraction of small cells (area1) blocked | 0.60 | 0.60 | 0.60 | 0.60 | 0.60 |
| Total Pressure Drop (60% area1 blocked), Pa | 5688 | 6237 | 6943 | 7366 | 6460 |
| Total area (area1 + area2) surface area/volume, in2/in3 (60% area1 blocked | 31.8 | 36.3 | 35.4 | 43.7 | 45.1 |

TABLE 3-continued

Comparative Examples 1 through 5

| Parameter | Comp. Ex. 1 | Comp. Ex. 2 | Comp. Ex. 3 | Comp. Ex. 4 | Comp. Ex. 5 |
| --- | --- | --- | --- | --- | --- |
| % of surface area/volume vs. for same small cell size (area1) comparative example surface area/volume (60% area1 blocked) | 100 | 100 | 100 | 100 | 100 |
| % improvement in pressure drop vs. comparative example pressure drop for same small cell area (area1) cpsi, (60% area1 blocked) | 0 | 0 | 0 | 0 | 0 |
| Fraction of small cells (area1) blocked | 0.70 | 0.70 | 0.70 | 0.70 | 0.70 |
| Total Pressure Drop (70% area1 blocked), Pa | 28,220 | 29,843 | 33,220 | 32,939 | 28,931 |
| Total area (area1 + area2) surface area/volume, in2/in3 (70% area1 blocked) | 23.8 | 27.2 | 26.5 | 32.8 | 33.8 |
| % of surface area/volume vs. for same small cell size (area1) comparative example surface area/volume (70% area1 blocked) | 100 | 100 | 100 | 100 | 100 |
| % improvement in pressure drop vs. comparative example pressure drop for same small cell area (area1) cpsi, (70% area1 blocked) | 0 | 0 | 0 | 0 | 0 |
| Fraction of small cells (area1) blocked | 0.80 | 0.80 | 0.80 | 0.80 | 0.80 |
| Total Pressure Drop (80% area1 blocked), Pa | 309,934 | 323,926 | 360,571 | 349,394 | 306,881 |
| Total area (area1 + area2) surface area/volume, in2/in3 (80% area1 blocked | 15.9 | 18.2 | 17.7 | 21.8 | 22.6 |
| % of surface area/volume vs. for same small cell size (area1) comparative example surface area/volume (80% area1 blocked) | 100 | 100 | 100 | 100 | 100 |
| % improvement in pressure drop vs. comparative example pressure drop for same small cell area (area1) cpsi, (80% area1 blocked) | 0 | 0 | 0 | 0 | 0 |

TABLE 4

Inventive Ex. 1 through Ex. 7

| Parameter | Ex. 1 | Ex. 2 | Ex. 3 | Ex. 4 | Ex. 5 | Ex. 6 | Ex. 7 |
| --- | --- | --- | --- | --- | --- | --- | --- |
| Substrate diameter, inches | 5.66 | 5.66 | 5.66 | 5.66 | 5.66 | 5.66 | 5.66 |
| Substrate length, inches | 6 | 6 | 6 | 6 | 6 | 6 | 6 |
| Major area (area1), cpsi | 450 | 450 | 450 | 600 | 600 | 600 | 600 |
| Major area (area1), % | 90 | 80 | 70 | 95 | 97 | 90 | 80 |
| Minor area (area2), cpsi | 200 | 200 | 200 | 200 | 200 | 200 | 200 |
| Minor area (area2), % | 10 | 20 | 30 | 5 | 3 | 10 | 20 |
| Wall thickness, mil | 3 | 3 | 3 | 3 | 3 | 3 | 3 |
| Fraction of small cells blocked | 0.0 | 0.0 | 0.0 | 0.0 | 0.0 | 0.0 | 0.0 |
| Total Pressure Drop (0% area1 blocked), Pa | 323 | 287 | 258 | 452 | 472 | 408 | 342 |
| Total area (area1 + area2) surface area/volume, in2/in3 (0% area1 blocked) | 76.9 | 74.4 | 71.9 | 88.9 | 89.7 | 87.1 | 83.5 |
| % of surface area/volume vs. for same small cell size (area1) comparative example surface area/volume (0% area1 blocked) | 96.8 | 93.6 | 90.5 | 98.0 | 98.8 | 96.0 | 91.9 |

TABLE 4-continued

| | | | | | | | |
|---|---|---|---|---|---|---|---|
| % improvement in pressure drop vs. comparative example pressure drop for same small cell area (area1) cpsi, (0% area1 blocked) | 12.5 | 22.2 | 29.9 | 10.7 | 6.7 | 19.3 | 32.4 |
| Fraction of small cells blocked | 0.1 | 0.1 | 0.1 | 0.1 | 0.1 | 0.1 | 0.1 |
| Total Pressure Drop (10% area1 blocked), Pa | 370 | 327 | 294 | 515 | 539 | 465 | 388 |
| Total area (area1 + area2) surface area/volume, in2/in3 (10% area1 blocked) | 69.8 | 68.0 | 66.3 | 80.3 | 80.9 | 78.9 | 76.2 |
| % of surface area/volume vs. for same small cell size (area1) comparative example surface area/volume (10% area1 blocked) | 97.6 | 95.2 | 92.7 | 98.3 | 99.0 | 96.6 | 93.3 |
| % improvement in pressure drop vs. comparative example pressure drop for same small cell area (area1) cpsi, (10% area1 blocked) | 13.0 | 23.0 | 30.9 | 10.9 | 6.8 | 19.7 | 32.9 |
| Fraction of small cells blocked | 0.2 | 0.2 | 0.2 | 0.2 | 0.2 | 0.2 | 0.2 |
| Total Pressure Drop (20% area1 blocked), Pa | 439 | 384 | 341 | 607 | 636 | 544 | 450 |
| Total area (area1 + area2) surface area/volume, in2/in3 (20% area1 blocked) | 62.6 | 61.7 | 60.7 | 71.7 | 72.1 | 70.8 | 68.9 |
| % of surface area/volume vs. for same small cell size (area1) comparative example surface area/volume (20% area1 blocked) | 98.5 | 97.0 | 95.6 | 98.7 | 99.2 | 97.5 | 94.9 |
| % improvement in pressure drop vs. comparative example pressure drop for same small cell area (area1) cpsi, (20% area1 blocked) | 14.2 | 25.0 | 33.3 | 11.5 | 7.2 | 20.6 | 34.3 |
| Fraction of small cells area (area$_1$) blocked | 0.30 | 0.30 | 0.30 | 0.30 | 0.30 | 0.30 | 0.30 |
| Total Pressure Drop (30% area$_1$ blocked), Pa | 550 | 469 | 409 | 755 | 797 | 668 | 541 |
| Total area (area$_1$ + area$_2$) surface area/volume, in$^2$/in$^3$ (30% area$_1$ blocked) | 55.5 | 55.3 | 55.2 | 63.1 | 63.3 | 62.6 | 61.7 |
| % of surface area/volume vs. for same small cell size (area$_1$) comparative example surface area/volume (30% area$_1$ blocked) | 99.7 | 99.5 | 99.2 | 99.3 | 99.6 | 98.5 | 97.0 |
| % improvement in pressure drop vs. comparative example pressure drop for same small cell area (area$_1$) cpsi, (30% area$_1$ blocked) | 17.4 | 29.6 | 38.6 | 13.0 | 8.2 | 23.1 | 37.7 |
| Fraction of small cells area (area$_1$) blocked | 0.40 | 0.40 | 0.40 | 0.40 | 0.40 | 0.40 | 0.40 |
| Total Pressure Drop (40% area$_1$ blocked), Pa | 758 | 609 | 512 | 1,038 | 1,114 | 886 | 685 |
| Total area (area$_1$ + area$_2$) surface area/volume, in$^2$/in$^3$ (40% area$_1$ blocked) | 48.3 | 49.0 | 49.6 | 54.5 | 54.5 | 54.4 | 54.4 |
| % of surface area/volume vs. for same small cell size (area$_1$) comparative example surface area/volume (40% area$_1$ blocked) | 101.4 | 102.7 | 104.1 | 100.0 | 100.0 | 99.9 | 99.9 |
| % improvement in pressure drop vs. comparative example pressure drop for same small cell area (area-0 cpsi, (40% area$_1$ blocked) | 24.6 | 39.3 | 49.0 | 17.0 | 10.9 | 29.2 | 45.2 |
| Fraction of small cells area (area$_1$) blocked | 0.50 | 0.50 | 0.50 | 0.50 | 0.50 | 0.50 | 0.50 |
| Total Pressure Drop (50% area$_1$ blocked), Pa | 1,218 | 871 | 681 | 1,704 | 1,903 | 1,344 | 940 |
| Total area (area$_1$ + area$_2$) surface area/volume, in$^2$/in$^3$ (50% area$_1$ blocked) | 41.2 | 42.6 | 44.1 | 45.8 | 45.7 | 46.3 | 47.1 |

TABLE 4-continued

| | | | | | | | |
|---|---|---|---|---|---|---|---|
| % of surface area/volume vs. for same small cell size ($area_1$) comparative example surface area/volume (50% $area_1$) | 103.6 | 107.3 | 110.9 | 101.0 | 100.6 | 101.9 | 103.9 |
| % improvement in pressure drop vs. comparative example pressure drop for same small cell area ($area_1$) cpsi, (50% $area_1$ blocked) | 37.9 | 55.6 | 65.2 | 25.5 | 16.9 | 41.2 | 58.9 |
| Fraction of small cells area ($area_1$) blocked | 0.60 | 0.60 | 0.60 | 0.60 | 0.60 | 0.60 | 0.60 |
| Total Pressure Drop (60% $area_1$ blocked), Pa | 2,497 | 1,440 | 991 | 3,774 | 4,544 | 2,553 | 1,469 |
| Total area ($area_1$ + $area_2$) surface area/volume, $in^2/in^3$ (60% $area_1$ blocked) | 34.0 | 36.3 | 38.5 | 37.2 | 36.8 | 38.1 | 39.9 |
| % of surface area/volume vs. for same small cell size ($area_1$) comparative example surface area/volume (60% $area_1$ blocked) | 107.0 | 114.1 | 121.1 | 102.5 | 101.5 | 104.9 | 109.8 |
| % improvement in pressure drop vs. comparative example pressure drop for same small cell area (area-0 cpsi, (60% $area_1$ blocked) | 56.1 | 74.7 | 82.6 | 39.5 | 27.1 | 59.1 | 76.4 |
| Fraction of small cells area ($area_1$) blocked | 0.70 | 0.70 | 0.70 | 0.70 | 0.70 | 0.70 | 0.70 |
| Total Pressure Drop (70% $area_1$ blocked), Pa | 7,223 | 2,940 | 1,639 | 12,938 | 17,595 | 6,805 | 2,801 |
| Total area ($area_1$ + $area_2$) surface area/volume, $in^2/in^3$ (70% $area_1$ blocked) | 26.9 | 29.9 | 32.9 | 28.6 | 28.0 | 29.9 | 32.6 |
| % of surface area/volume vs. for same small cell size ($area_1$) comparative example surface area/volume (70% $area_1$ blocked) | 112.7 | 125.5 | 138.2 | 104.9 | 103.0 | 109.9 | 119.8 |
| % improvement in pressure drop vs. comparative example pressure drop for same small cell area (area-0 cpsi, (70% $area_1$ blocked) | 74.4 | 89.6 | 94.2 | 56.6 | 41.0 | 77.2 | 90.6 |
| Fraction of small cells area ($area_1$) blocked | 0.80 | 0.80 | 0.80 | 0.80 | 0.80 | 0.80 | 0.80 |
| Total Pressure Drop (80% $area_1$ blocked), Pa | 33,213 | 8,057 | 3,248 | 81,098 | 133,595 | 29,170 | 7,197 |
| Total area ($area_1$ + $area_2$) surface area/volume, $in^2/in^3$ (80% $area_1$ blocked) | 19.7 | 23.5 | 27.4 | 20.0 | 19.2 | 21.8 | 25.4 |
| % of surface area/volume vs. for same small cell size ($area_1$) comparative example surface area/volume (80% $area_1$ blocked) | 124.1 | 148.2 | 172.3 | 109.9 | 106.0 | 119.8 | 139.7 |
| % improvement in pressure drop vs. comparative example pressure drop for same small cell area ($area_1$) cpsi, (80% $area_1$ blocked) | 89.3 | 97.4 | 99.0 | 75.0 | 58.8 | 91.0 | 97.8 |

| | Inventive Ex. 8 through Ex. 14 | | | | | | |
|---|---|---|---|---|---|---|---|
| Parameter | Ex. 8 | Ex. 9 | Ex. 10 | Ex. 11 | Ex. 12 | Ex. 13 | Ex. 14 |
| Substrate diameter, inches | 5.66 | 5.66 | 5.66 | 5.66 | 5.66 | 5.66 | 5.66 |
| Substrate length, inches | 6 | 6 | 6 | 6 | 6 | 6 | 6 |
| Major area ($area_1$), cpsi | 600 | 900 | 900 | 900 | 600 | 600 | 600 |
| Major area ($area_1$), % | 70 | 90 | 80 | 70 | 90 | 80 | 90 |
| Minor area ($area_2$), cpsi | 200 | 200 | 200 | 200 | 100 | 100 | 50 |
| Minor area ($area_2$), % | 30 | 10 | 20 | 30 | 10 | 20 | 10 |
| wall thickness, mil | 3 | 3 | 3 | 3 | 3 | 3 | 3 |
| Fraction of small cells area ($area_1$) blocked | 0.00 | 0.00 | 0.00 | 0.00 | 0.00 | 0.00 | 0.00 |
| Total Pressure Drop (0% $area_1$ blocked), Pa | 295 | 556 | 424 | 343 | 313 | 227 | 213 |
| Total area ($area_1$ + area2) surface area/volume, $in^2/in^3$ (0% $area_1$ blocked) | 79.8 | 103.7 | 98.2 | 92.7 | 85.6 | 80.4 | 84.5 |

TABLE 4-continued

| | | | | | | | |
|---|---|---|---|---|---|---|---|
| % of surface area/volume vs. for same small cell size (area$_1$) comparative example surface area/volume (0% area$_1$ blocked) | 87.9 | 95.0 | 89.9 | 84.9 | 94.3 | 88.5 | 93.0 |
| % improvement in pressure drop vs. comparative example pressure drop for same small cell area (area$_1$) cpsi, (0% area$_1$ blocked) | 41.7 | 31.0 | 47.3 | 57.4 | 15.1 | 38.6 | 42.4 |
| Fraction of small cells area (area$_1$) blocked | 0.10 | 0.10 | 0.10 | 0.10 | 0.10 | 0.10 | 0.10 |
| Total Pressure Drop (10% area$_1$ blocked), Pa | 333 | 627 | 477 | 385 | 356 | 256 | 241 |
| Total area (area$_1$ + area$_2$) surface area/volume, in$^2$/in$^3$ (10% area$_1$ blocked) | 73.4 | 93.9 | 89.5 | 85.0 | 77.4 | 73.1 | 76.3 |
| % of surface area/volume vs. for same small cell size (area$_1$) comparative example surface area/volume (10% area$_1$ blocked) | 89.9 | 95.5 | 91.0 | 86.5 | 94.7 | 89.5 | 93.4 |
| % improvement in pressure drop vs. comparative example pressure drop for same small cell area (area$_1$) cpsi, (10% area$_1$ blocked) | 42.4 | 31.2 | 47.6 | 57.7 | 16.2 | 39.7 | 43.2 |
| Fraction of small cells area (area$_1$) blocked | 0.20 | 0.20 | 0.20 | 0.20 | 0.20 | 0.20 | 0.20 |
| Total Pressure Drop (20% area$_1$ blocked), Pa | 384 | 725 | 548 | 440 | 416 | 296 | 281 |
| Total area (area$_1$ + area$_2$) surface area/volume, in$^2$/in$^3$ (20% area$_1$ blocked) | 67.1 | 84.0 | 80.7 | 77.4 | 69.2 | 65.9 | 68.1 |
| % of surface area/volume vs. for same small cell size (area$_1$) comparative example surface area/volume (20% area$_1$ blocked) | 92.4 | 96.2 | 92.4 | 88.6 | 95.3 | 90.7 | 93.8 |
| % improvement in pressure drop vs. comparative example pressure drop for same small cell area (area$_1$) cpsi, (20% area$_1$ blocked) | 44.0 | 31.8 | 48.4 | 58.6 | 18.7 | 42.1 | 45.0 |
| Fraction of small cells area (area$_1$) blocked | 0.30 | 0.30 | 0.30 | 0.30 | 0.30 | 0.30 | 0.30 |
| Total Pressure Drop (30% area$_1$ blocked), Pa | 455 | 868 | 646 | 514 | 508 | 354 | 341 |
| Total area (area$_1$ + area$_2$) surface area/volume, in$^2$/in$^3$ (30% area$_1$ blocked) | 60.7 | 74.2 | 72.0 | 69.8 | 61.1 | 58.6 | 60.0 |
| % of surface area/volume vs. for same small cell size (area$_1$) comparative example surface area/volume (30% area$_1$ blocked) | 95.6 | 97.1 | 94.2 | 91.3 | 96.1 | 92.2 | 94.4 |
| % improvement in pressure drop vs. comparative example pressure drop for same small cell area (area-0 cpsi, (30% area$_1$ blocked) | 47.6 | 33.5 | 50.5 | 60.6 | 23.8 | 46.9 | 48.8 |
| Fraction of small cells area (area$_1$) blocked | 0.40 | 0.40 | 0.40 | 0.40 | 0.40 | 0.40 | 0.40 |
| Total Pressure Drop (40% area$_1$ blocked), Pa | 559 | 1,105 | 794 | 620 | 664 | 441 | 440 |
| Total area (area$_1$ + area$_2$) surface area/volume, in$^2$/in$^3$ (40% area$_1$ blocked) | 54.4 | 64.4 | 63.2 | 62.1 | 52.9 | 51.3 | 51.8 |
| % of surface area/volume vs. for same small cell size (area$_1$) comparative example surface area/volume (40% area$_1$ | 99.8 | 98.3 | 96.5 | 94.8 | 97.1 | 94.2 | 95.1 |
| % improvement in pressure drop vs. comparative example pressure drop for same small cell area (area$_1$) cpsi, (40% area$_1$ blocked) | 55.3 | 37.9 | 55.3 | 65.1 | 33.9 | 56.1 | 56.2 |
| Fraction of small cells area (area$_1$) blocked | 0.50 | 0.50 | 0.50 | 0.50 | 0.50 | 0.50 | 0.50 |

TABLE 4-continued

| | | | | | | | |
|---|---|---|---|---|---|---|---|
| Total Pressure Drop (50% area₁ blocked), Pa | 727 | 1,561 | 1,040 | 783 | 979 | 591 | 627 |
| Total area (area₁ + area₂) surface area/volume, in²/in³ (50% area₁ blocked) | 48.0 | 54.6 | 54.5 | 54.5 | 44.7 | 44.1 | 43.6 |
| % of surface area/volume vs. for same small cell size (area₁) comparative example surface area/volume (50% area₁ blocked) | 105.8 | 99.9 | 99.8 | 99.8 | 98.5 | 97.1 | 96.1 |
| % improvement in pressure drop vs. comparative example pressure drop for same small cell area (area-1 cpsi, (50% area₁ blocked) | 68.2 | 47.6 | 65.1 | 73.7 | 50.1 | 69.9 | 68.0 |
| Fraction of small cells area (area₁) blocked | 0.60 | 0.60 | 0.60 | 0.60 | 0.60 | 0.60 | 0.60 |
| Total Pressure Drop (60% area₁ blocked), Pa | 1,023 | 2,656 | 1,510 | 1,057 | 1,753 | 884 | 1,053 |
| Total area (area₁ + area₂) surface area/volume, in²/in³ (60% area₁ blocked) | 41.7 | 44.7 | 45.8 | 46.8 | 36.6 | 36.8 | 35.4 |
| % of surface area/volume vs. for same small cell size (area₁) comparative example surface area/volume (60% area₁ blocked) | 114.8 | 102.4 | 104.8 | 107.2 | 100.7 | 101.4 | 97.6 |
| % improvement in pressure drop vs. comparative example pressure drop for same small cell area (area-1 cpsi, (60% area₁ blocked) | 83.6 | 63.9 | 79.5 | 85.6 | 69.2 | 84.5 | 81.5 |
| Fraction of small cells area (area₁) blocked | 0.70 | 0.70 | 0.70 | 0.70 | 0.70 | 0.70 | 0.70 |
| Total Pressure Drop (70% area₁ blocked), Pa | 1,625 | 6,173 | 2,602 | 1,590 | 4,258 | 1,579 | 2,300 |
| Total area (area₁ + area₂) surface area/volume, in²/in³ (70% area₁ blocked) | 35.3 | 34.9 | 37.0 | 39.2 | 28.4 | 29.5 | 27.3 |
| % of surface area/volume vs. for same small cell size (area₁) comparative example surface area/volume (70% area₁ blocked) | 129.7 | 106.5 | 113.1 | 119.6 | 104.2 | 108.5 | 100.2 |
| % improvement in pressure drop vs. comparative example pressure drop for same small cell area (area₁) cpsi, (70% area₁ blocked) | 94.6 | 81.3 | 92.1 | 95.2 | 84.9 | 94.4 | 91.9 |
| Fraction of small cells area (area₁) blocked | 0.80 | 0.80 | 0.80 | 0.80 | 0.80 | 0.80 | 0.80 |
| Total Pressure Drop (80% area₁ blocked), Pa | 3,106 | 23,149 | 5,967 | 2,866 | 16,159 | 3,768 | 7,543 |
| Total area (area₁ + area₂) surface area/volume, in²/in³ (80% area₁ blocked) | 29.0 | 25.1 | 28.3 | 31.5 | 20.2 | 22.3 | 19.1 |
| % of surface area/volume vs. for same small cell size (area₁) comparative example surface area/volume (80% area₁ blocked) | 159.5 | 114.8 | 129.6 | 144.4 | 111.4 | 122.7 | 105.2 |
| % improvement in pressure drop vs. comparative example pressure drop for same small cell area (area₁) | 99.0 | 93.4 | 98.3 | 99.2 | 94.8 | 98.8 | 97.6 |

| Inventive Ex. 15 through Ex. 21 | | | | | | | |
|---|---|---|---|---|---|---|---|
| Parameter | Ex. 15 | Ex. 16 | Ex. 17 | Ex. 18 | Ex. 19 | Ex. 20 | Ex. 21 |
| Substrate diameter, inches | 5.66 | 5.66 | 5.66 | 5.66 | 5.66 | 5.66 | 5.66 |
| Substrate length, inches | 6 | 6 | 6 | 6 | 6 | 6 | 6 |
| Major area (area₁), cpsi | 900 | 900 | 600 | 900 | 900 | 600 | 900 |
| Major area (area₁), % | 80 | 90 | 80 | 95 | 95 | 75 | 75 |
| Minor area (area₂), cpsi | 100 | 50 | 200 | 200 | 300 | 150 | 225 |
| Minor area (area₂), % | 20 | 10 | 20 | 5 | 5 | 25 | 25 |
| wall thickness, mil | 3 | 3 | 4 | 2 | 2 | 3 | 3 |
| Fraction of small cells area (area₁) blocked | 0.00 | 0.00 | 0.00 | 0.00 | 0.00 | 0.00 | 0.00 |

TABLE 4-continued

| | | | | | | | |
|---|---|---|---|---|---|---|---|
| Total Pressure Drop (0% area₁ blocked), Pa | 258 | 245 | 373 | 586 | 633 | 265 | 411 |
| Total area (area₁ + area₂) surface area/volume, in²/in³ (0% area₁ blocked) | 95.1 | 101.0 | 81.4 | 109.9 | 110.5 | 79.9 | 96.2 |
| % of surface area/volume vs. for same small cell size (area₁) comparative example surface area/volume (0% area₁ blocked) | 87.1 | 92.5 | 92.1 | 97.4 | 98.0 | 88.0 | 88.1 |
| % improvement in pressure drop vs. comparative example pressure drop for same small cell area (area₁) cpsi, (0% area₁ blocked) | 67.9 | 69.6 | 33.8 | 17.1 | 10.4 | 47.6 | 48.9 |
| Fraction of small cells area (area₁) blocked | 0.10 | 0.10 | 0.10 | 0.10 | 0.10 | 0.10 | 0.10 |
| Total Pressure Drop (10% area₁ blocked), Pa | 290 | 276 | 423 | 663 | 716 | 300 | 463 |
| Total area (area₁ + area₂) surface area/volume, in²/in³ (10% area₁ blocked) | 86.4 | 91.2 | 74.3 | 99.2 | 99.8 | 73.1 | 88.0 |
| % of surface area/volume vs. for same small cell size (area₁) comparative example surface area/volume (10% area₁ blocked) | 87.9 | 92.8 | 93.4 | 97.7 | 98.3 | 89.4 | 89.6 |
| % improvement in pressure drop vs. comparative example pressure drop for same small cell area (area₁) cpsi, (10% area₁ blocked) | 68.2 | 69.7 | 34.3 | 17.2 | 10.5 | 48.2 | 49.2 |
| Fraction of small cells area (area₁) blocked | 0.20 | 0.20 | 0.20 | 0.20 | 0.20 | 0.20 | 0.20 |
| Total Pressure Drop (20% area₁ blocked), Pa | 332 | 318 | 491 | 769 | 831 | 346 | 530 |
| Total area (area₁ + area₂) surface area/volume, in²/in³ (20% area₁ blocked) | 77.6 | 81.4 | 67.2 | 88.5 | 89.1 | 66.3 | 79.8 |
| % of surface area/volume vs. for same small cell size (area₁) comparative example surface area/volume (20% area₁ blocked) | 88.9 | 93.2 | 95.1 | 98.0 | 98.7 | 91.2 | 91.4 |
| % improvement in pressure drop vs. comparative example pressure drop for same small cell area (area₁) cpsi, (20% area₁ blocked) | 68.8 | 70.1 | 35.7 | 17.6 | 10.9 | 49.5 | 50.1 |
| Fraction of small cells area (area₁) blocked | 0.30 | 0.30 | 0.30 | 0.30 | 0.30 | 0.30 | 0.30 |
| Total Pressure Drop (30% area₁ blocked), Pa | 389 | 377 | 589 | 932 | 1,009 | 412 | 622 |
| Total area (area₁ + area₂) surface area/volume, in²/in³ (30% area₁ blocked) | 68.9 | 71.6 | 60.2 | 77.8 | 78.4 | 59.5 | 71.7 |
| % of surface area/volume vs. for same small cell size (area₁) comparative example surface area/volume (30% area₁ blocked) | 90.2 | 93.6 | 97.3 | 98.5 | 99.2 | 93.6 | 93.7 |
| % improvement in pressure drop vs. comparative example pressure drop for same small cell area (area₁) cpsi, (30% area₁ blocked) | 70.2 | 71.1 | 39.1 | 18.8 | 12.1 | 52.6 | 52.3 |
| Fraction of small cells area (area₁) blocked | 0.40 | 0.40 | 0.40 | 0.40 | 0.40 | 0.40 | 0.40 |
| Total Pressure Drop (40% area₁ blocked), Pa | 473 | 470 | 746 | 1,219 | 1,325 | 510 | 758 |
| Total area (area₁ + area₂) surface area/volume, in²/in³ (40% area₁ blocked) | 60.2 | 61.7 | 53.1 | 67.0 | 67.6 | 52.6 | 63.5 |
| % of surface area/volume vs. for same small cell size (area₁) comparative example surface area/volume (40% area₁ blocked) | 91.8 | 94.2 | 100.1 | 99.1 | 99.9 | 96.7 | 96.9 |

TABLE 4-continued

| | | | | | | | |
|---|---|---|---|---|---|---|---|
| % improvement in pressure drop vs. comparative example pressure drop for same small cell area (area-0 cpsi, (40% area₁ blocked) | 73.4 | 73.6 | 46.4 | 22.0 | 15.2 | 59.2 | 57.4 |
| Fraction of small cells area (area₁) blocked | 0.50 | 0.50 | 0.50 | 0.50 | 0.50 | 0.50 | 0.50 |
| Total Pressure Drop (50% area₁ blocked), Pa | 607 | 631 | 1,024 | 1,843 | 2,025 | 674 | 974 |
| Total area (area₁ + area₂) surface area/volume, in²/in³ (50% area₁ blocked) | 51.4 | 51.9 | 46.0 | 56.3 | 56.9 | 45.8 | 55.3 |
| % of surface area/volume vs. for same small cell size (area₁) comparative example surface area/volume (50% area₁ blocked) | 94.2 | 95.1 | 104.2 | 99.9 | 100.9 | 101.0 | 101.2 |
| % improvement in pressure drop vs. comparative example pressure drop for same small cell area (area₁) cpsi, (50% area₁ blocked) | 79.6 | 78.8 | 59.8 | 29.6 | 22.6 | 70.5 | 67.3 |
| Fraction of small cells area (area₁) blocked | 0.60 | 0.60 | 0.60 | 0.60 | 0.60 | 0.60 | 0.60 |
| Total Pressure Drop (60% area₁ blocked), Pa | 849 | 964 | 1,597 | 3,633 | 4,091 | 979 | 1,361 |
| Total area (area₁ + area₂) surface area/volume, in²/in³ (60% area₁ blocked) | 42.7 | 42.1 | 39.0 | 45.6 | 46.2 | 39.0 | 47.1 |
| % of surface area/volume vs. for same small cell size (area₁) comparative example surface area/volume (60% area₁ blocked) | 97.8 | 96.3 | 110.2 | 101.1 | 102.4 | 107.5 | 107.8 |
| % improvement in pressure drop vs. comparative example pressure drop for same small cell area (area-0 cpsi, (60% area₁ blocked) | 88.5 | 86.9 | 77.0 | 43.8 | 36.7 | 84.3 | 81.5 |
| Fraction of small cells area (area₁) blocked | 0.70 | 0.70 | 0.70 | 0.70 | 0.70 | 0.70 | 0.70 |
| Total Pressure Drop (70% area₁ blocked), Pa | 1,373 | 1,835 | 3,037 | 11,030 | 12,966 | 1,653 | 2,176 |
| Total area (area₁ + area₂) surface area/volume, in²/in³ (70% area₁ blocked) | 34.0 | 32.3 | 31.9 | 34.9 | 35.5 | 32.2 | 38.9 |
| % of surface area/volume vs. for same small cell size (area₁) comparative example surface area/volume (70% area₁ blocked) | 103.7 | 98.5 | 120.3 | 103.1 | 104.9 | 118.3 | 118.7 |
| % improvement in pressure drop vs. comparative example pressure drop for same small cell area (area-1 cpsi, (70% area₁ blocked) | 95.8 | 94.4 | 90.9 | 61.9 | 55.2 | 94.5 | 93.4 |
| Fraction of small cells area (area₁) blocked | 0.80 | 0.80 | 0.80 | 0.80 | 0.80 | 0.80 | 0.80 |
| Total Pressure Drop (80% area₁ blocked), Pa | 2,882 | 5,099 | 7,770 | 62,409 | 78,185 | 3,529 | 4,356 |
| Total area (area₁ + area₂) surface area/volume, in²/in³ (80% area₁ blocked) | 25.2 | 22.4 | 24.8 | 24.2 | 24.8 | 25.4 | 30.7 |
| % of surface area/volume vs. for same small cell size (area₁) comparative example surface area/volume (80% area₁ blocked) | 115.5 | 102.7 | 140.4 | 107.2 | 109.8 | 140.0 | 140.6 |
| % improvement in pressure drop vs. comparative example pressure drop for same small cell area (area₁) cpsi, (80% area₁ blocked) | 99.2 | 98.5 | 97.8 | 79.7 | 74.5 | 98.9 | 98.8 |

Definitions

The acronym "AC" refers to asymmetric cell, i.e., a honeycomb comprising large channels and small channels of different hydraulic diameters.

The acronym "cpsi" refers to channels per square inch.

The acronym "DOC" refers to diesel oxidation catalyst.

The acronym "DPF" refers to diesel particulate filter.

The acronym "GSA" refers to geometric surface area.

The acronym "OFA" refers to open frontal area.

The acronym "SOF" refers to soluble organic fraction.

The term "hydraulic diameter" refers to a parameter used to express fluid flow characteristics and pressure drop characteristics of non-circular channels in terms of their circular equivalents. The general formula for determining hydraulic diameter is $dh=4A/P$, where dh is the hydraulic diameter, A is the transverse cross-sectional flow area, and P is the wetted perimeter of the channel. Thus for a rectangle, the hydraulic diameter is equal to $2WH/W+H$, where W is the width, and H is the height of the rectangular channel in the honeycomb body.

Although the terms first, second, etc., may be used herein to describe various elements, components, regions, parts or sections, these elements, components, regions, parts or sections, should not be limited by these terms. The terms may be used to distinguish one element, component, region, part or section, from another element, component, region, part or section. For example, a first element, component, region, part or section discussed above could be termed a second element, component, region, part or section without departing from the teachings of the present disclosure.

While embodiments of this disclosure have been disclosed in example forms, many modifications, additions, and deletions can be made therein without departing from the scope of this disclosure, as set forth in the subjoined claims and their equivalents.

What is claimed is:

1. A honeycomb body, comprising:
a honeycomb structure comprising a plurality of unit channel structures disposed in a repeating pattern, each unit channel structure comprising:
a plurality of channels disposed in parallel to each other in an axial direction, wherein a first portion of the plurality of channels have a $dh \geq 1.1$ mm, a second portion of the plurality of channels have a $dh<1.1$ mm, and the plurality of channels comprise $GSA \geq 2.9$ mm$^{-1}$, wherein dh is hydraulic diameter and GSA is a geometric surface area;
wherein CR is a channel ratio of a total cross-sectional area of the first portion of the plurality of channels to a total cross-sectional area of all the plurality of channels in the unit channel structure, expressed as a percentage, and $3\% \leq CR \leq 40\%$.

2. The honeycomb body of claim 1, wherein the plurality of channels extend from an inlet face to an outlet face.

3. The honeycomb body of claim 1, wherein every channel of the plurality of channels is a flow-through channel.

4. The honeycomb body of claim 1, wherein every channel of the plurality of channels is devoid of plugging.

5. The honeycomb body of claim 1, wherein at least a portion of the plurality of channels have a catalytic coating disposed thereon.

6. The honeycomb body of claim 1, wherein the honeycomb body comprises:
$CD \geq 62.0$ cm$^2$ (400 cpsi), wherein CD is channel density; and
the first portion of the plurality of channels comprise 6.2 channels/cm$^2$ (40 cpsi)$\leq CD \leq 46.5$ channels/cm$^2$ (300 cpsi).

7. The honeycomb body of claim 1, wherein the honeycomb body comprises:
$CD \geq 77.5$ cm$^2$ (500 cpsi), wherein CD is channel density; and
the first portion of the plurality of channels comprise 6.2 channels/cm$^2$ (40 cpsi)$\leq CD \leq 31.0$ channels/cm$^2$ (200 cpsi).

8. The honeycomb body of claim 1, wherein the honeycomb body comprises:
$CD \geq 93.0$ cm$^2$ (600 cpsi), wherein CD is channel density; and
the first portion of the plurality of channels comprise 6.2 channels/cm$^2$ (40 cpsi)$\leq CD \leq 31.0$ channels/cm$^2$ (200 cpsi).

9. The honeycomb body of claim 1, wherein the honeycomb body comprises:
$CD \geq 139.5$ cm$^2$ (900 cpsi), wherein CD is channel density; and
the first portion of the plurality of channels comprise 6.2 channels/cm$^2$ (40 cpsi)$\leq CD \leq 31.0$ channels/cm$^2$ (200 cpsi).

10. A diesel oxidation catalyst, comprising:
a honeycomb body having a first portion of channels and a second portion of channels, wherein the first portion of channels have a hydraulic diameter greater than or equal to 1.1 mm, the second portion of channels have a hydraulic diameter less than 1.1 mm, and the honeycomb body has a geometric surface area greater than or equal to 2.9 mm$^{-1}$;
wherein the first portion of channels have a first total cross-sectional area, the second portion of channels have a second total cross-sectional area, and a channel ratio of the first total cross-sectional area to a sum of the first total cross-sectional area and the second total cross-sectional area, expressed as a percentage, is between 3% and 40%.

11. The diesel oxidation catalyst of claim 10, wherein the first portion of channels and the second portion of channels extend from an inlet face to an outlet face, and each channel of the first portion of channels and the second portion of channels is a flow-through channel.

12. The diesel oxidation catalyst of claim 10, wherein at least some of the first portion of channels and at least some of the second portion of channels have a catalyst-containing coating disposed thereon.

13. The diesel oxidation catalyst of claim 12, wherein the first portion of channels and the second portion of channels, taken together, comprise a channel density greater than or equal to 62.0 channels/cm$^2$ (400 cpsi), and the first portion of channels, taken alone, has a channel density ranging from 6.2 channels/cm$^2$ (40 cpsi) to 46.5 channels/cm$^2$ (300 cpsi).

14. The diesel oxidation catalyst of claim 12, wherein the first portion of channels and the second portion of channels, taken together, have a channel density greater than or equal to 77.5 channels/cm$^2$ (500 cpsi), and the first portion of channels, taken alone, has a channel density ranging from 6.2 channels/cm$^2$ (40 cpsi) to 31.0 channels/cm$^2$ (200 cpsi).

15. The diesel oxidation catalyst of claim 12, wherein the first portion of channels and the second portion of channels, taken together, have a channel density greater than or equal to 93.0 channels/cm$^2$ (600 cpsi), and the first portion of channels, taken alone, has a channel density ranging from 6.2 channels/cm$^2$ (40 cpsi) to 31.0 channels/cm$^2$ (200 cpsi).

16. The diesel oxidation catalyst of claim 12, wherein the first portion of channels and the second portion of channels, taken together, have a channel density greater than or equal to 139.5 channels/cm$^2$ (900 cpsi), and the first portion of channels, taken alone, has a channel density ranging from 6.2 channels/cm$^2$ (40 cpsi) to 31.0 channels/cm$^2$ (200 cpsi).

17. A method of removing soot from soot-laden exhaust gas with a honeycomb body, the method comprising:
flowing the soot-laden exhaust gas through large channels and small channels of the honeycomb body, wherein the large channels have a hydraulic diameter greater than 1.1 mm, the small channels have a hydraulic diameter less than 1.1 mm, and the large channels and small channels, taken together, have a geometric surface area greater than 2.9 mm$^{-1}$; and wherein at least some of the large channels act as bypass channels;

wherein CR is a channel ratio of a total cross-sectional area of the large channels divided by a total cross-sectional area of the large channels and the small channels, taken together, and expressed as a percentage, and 3%≤CR≤40%.

18. The method of claim 17, wherein the honeycomb body comprises:

CD≥62 channels/cm$^2$ (400 cpsi);

and the large channels, taken alone, comprise 6.2 channels/cm$^2$ (40 cpsi)≤CD≤46.5 channels/cm$^2$ (300 cpsi).

* * * * *

UNITED STATES PATENT AND TRADEMARK OFFICE
CERTIFICATE OF CORRECTION

PATENT NO. : 11,673,132 B2
APPLICATION NO. : 17/294109
DATED : June 13, 2023
INVENTOR(S) : Douglas Munroe Beall et al.

Page 1 of 1

It is certified that error appears in the above-identified patent and that said Letters Patent is hereby corrected as shown below:

On the Title Page

Item (57), in Column 2, in "Abstract", Line 6, after "diameter" insert -- $dh2$ --.

On the page 2, in Column 2, under "Other Publications", Line 3, delete "Original);" and insert -- Original Copy); --.

Signed and Sealed this
Seventeenth Day of December, 2024

Derrick Brent
*Acting Director of the United States Patent and Trademark Office*